(12) United States Patent
Sato et al.

(10) Patent No.: US 7,931,105 B2
(45) Date of Patent: Apr. 26, 2011

(54) STRUCTURE FOR MOUNTING BATTERIES ONTO ELECTRIC VEHICLES

(75) Inventors: Kenichi Sato, Eindhoven (NL); Haruchika Nishino, Okazaki (JP); Seiichi Takasaki, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki (JP)

( * ) Notice: Subject to any disclaimer, the term of this patent is extended or adjusted under 35 U.S.C. 154(b) by 619 days.

(21) Appl. No.: 12/010,412

(22) Filed: Jan. 24, 2008

(65) Prior Publication Data

US 2008/0190679 A1   Aug. 14, 2008

(30) Foreign Application Priority Data

Jan. 26, 2007   (JP) .................................. 2007-017028

(51) Int. Cl.
*B60R 16/04* (2006.01)
(52) U.S. Cl. .......... 180/68.5; 180/2.1; 180/2.2; 180/274
(58) Field of Classification Search ............ 180/2.1–2.2, 180/68.5, 274, 65.29; 296/187.03
See application file for complete search history.

(56) References Cited

U.S. PATENT DOCUMENTS

| | | | | |
|---|---|---|---|---|
| 5,390,754 A | * | 2/1995 | Masuyama et al. | 180/68.5 |
| 5,392,873 A | * | 2/1995 | Masuyama et al. | 180/68.5 |
| 5,501,289 A | * | 3/1996 | Nishikawa et al. | 180/68.5 |
| 5,534,364 A | * | 7/1996 | Watanabe et al. | 429/61 |
| 5,558,949 A | * | 9/1996 | Iwatsuki et al. | 429/99 |
| 5,886,501 A | * | 3/1999 | Marks et al. | 320/112 |
| 5,918,692 A | * | 7/1999 | Sekita et al. | 180/56 |
| 5,960,901 A | * | 10/1999 | Hanagan | 180/210 |
| 6,188,574 B1 | * | 2/2001 | Anazawa | 361/695 |
| 6,189,635 B1 | * | 2/2001 | Schuler et al. | 180/68.5 |
| 6,598,691 B2 | * | 7/2003 | Mita et al. | 180/65.1 |
| 7,051,825 B2 | * | 5/2006 | Masui et al. | 180/68.5 |
| 7,112,387 B2 | * | 9/2006 | Kimoto et al. | 429/99 |
| 7,384,704 B2 | * | 6/2008 | Scott | 429/62 |
| 7,610,978 B2 | * | 11/2009 | Takasaki et al. | 180/68.5 |
| 7,654,351 B2 | * | 2/2010 | Koike et al. | 180/68.5 |
| 7,749,644 B2 | * | 7/2010 | Nishino | 429/100 |
| 2001/0030069 A1 | * | 10/2001 | Misu et al. | 180/68.1 |
| 2003/0047366 A1 | * | 3/2003 | Andrew et al. | 180/68.5 |
| 2003/0186115 A1 | * | 10/2003 | Shibasawa et al. | 429/100 |
| 2007/0215399 A1 | * | 9/2007 | Watanabe et al. | 180/68.5 |
| 2008/0196957 A1 | * | 8/2008 | Koike et al. | 180/68.5 |

FOREIGN PATENT DOCUMENTS

| | | |
|---|---|---|
| EP | 1 479 567 A1 | 11/2004 |
| JP | 7-69077 A | 3/1995 |
| JP | 7-69237 A | 3/1995 |
| JP | 2003-182378 A | 7/2003 |
| JP | 2006-40645 A | 2/2006 |
| JP | 2006-182099 A | 7/2006 |
| WO | WO-99/11507 A1 | 3/1999 |

* cited by examiner

*Primary Examiner* — J. Allen Shriver, II
*Assistant Examiner* — James Triggs
(74) *Attorney, Agent, or Firm* — Birch, Stewart, Kolasch & Birch, LLP

(57) ABSTRACT

A structure for mounting a battery onto an electric vehicle comprising: a body member, which is made from metal, forming a body of the electric vehicle a battery case, which is made from resin, containing the battery charging electric power for driving the electric vehicle; a framework member, which is made from metal, being embedded in the battery case; and a connecting member connecting between the framework member and the body member.

13 Claims, 21 Drawing Sheets

STRUCTURE FOR MOUNTING BATTERIES ONTO ELECTRIC VEHICLES

BACKGROUND OF THE INVENTION (1) Field of the Invention

The present invention relates to a structure for mounting a battery onto an electric vehicle.

(2) Description of the Related Art

Structures for mounting batteries using battery frames onto electric vehicles have been known in the art. The following related documents 1 and 2 disclose examples of such a structure. Although no description about material of the battery frame is disclosed in the related documents 1 and 2, conventional battery frames are metal because the battery frames support heavy batteries.

[Related Document 1] Japanese Laid-open Publication H7-69077

[Related Document 2] Japanese Laid-open Publication H7-69237

However, metal battery frames increase the weight of electric vehicles, and accordingly, the range of the electric vehicles becomes shorter and the drivability becomes worse.

SUMMARY OF THE INVENTION

The present invention has been developed in consideration of this situation, and it is therefore an object of the invention to provide a structure for mounting a battery onto an electric vehicle to improve the crash-resistant capability of the battery mounted on the electric vehicle while preventing increased weight and enhancing the rigidity of the electric vehicle.

For this purpose, in accordance with an aspect of the present invention, there is provided a structure for mounting the battery onto the electric vehicle comprising: a body member, which is made from metal, forming a body of the electric vehicle; a battery case, which is made from resin, including the battery containing electric power for driving the electric vehicle; a framework member, which is made from metal, being embedded in said battery case; a connecting member connecting between said framework member and said body member.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 (B) is a side view schematically showing the same built-in nut in the embodiment of the present invention;

FIG. 6 (C) is a bottom view schematically showing the same built-in nut in the embodiment of the present invention;

DETAILED DESCRIPTION OF THE INVENTION

The embodiment of the present invention will now be described with reference to the accompanying drawings.

Figure 1:
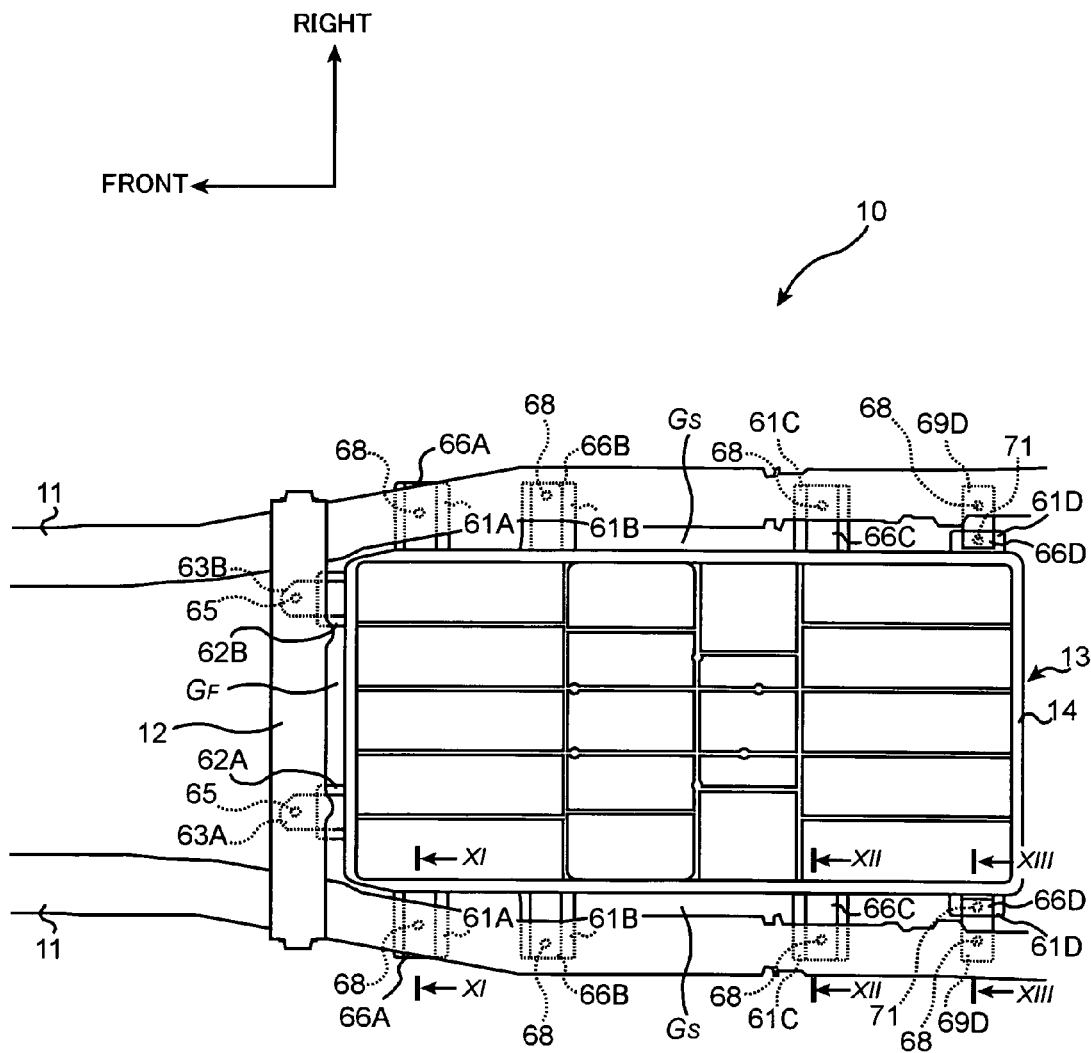
FIG. 1 is a top view schematically showing the entire configuration of an embodiment of the present invention.

As shown in FIG. 1, side members (also called 'body members' or 'first body members') 11 and 11 are mounted on the left and right sides of an electric vehicle 10. The side members 11 and 11 extend in the longitudinal direction of the electric vehicle 10.

Further, a battery cross member (also called 'body member' or 'second body member') 12, which extends in the transversal direction (left-right direction) and which connects the pair of side members 11 and 11, is also mounted in the electric vehicle 10.

The side members 11 and 11 and the battery cross member 12 are iron, and constitute a body of the electric vehicle 10.

At a position between the pair of side members 11 and 11 and rear of the battery cross member 12, a battery case 13 is disposed. The battery case 13, which is made from polybutylene resin including glass fibers, contains and holds batteries 20 (shown in FIG. 4) inside thereof while avoiding ventilation between outside and inside by keeping the inside of battery case 13 airtight.

Figure 2:
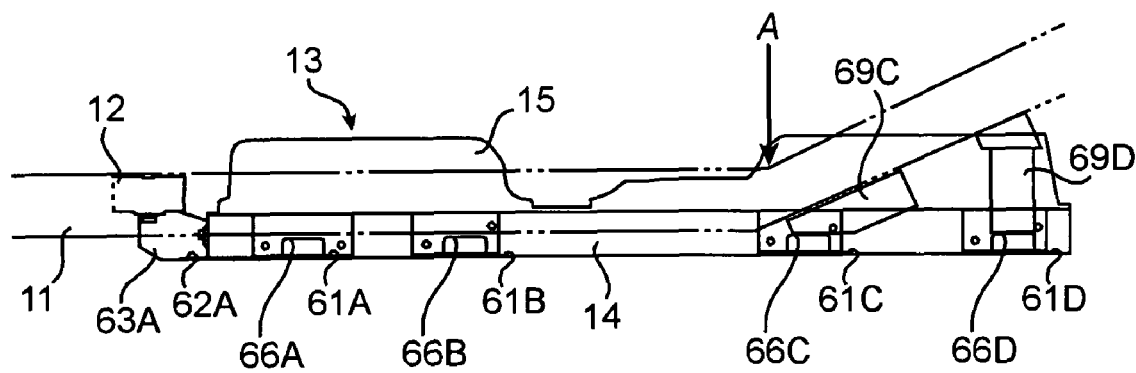
FIG. 2 is a side view schematically showing the entire configuration of the embodiment of the present invention.

As shown in FIG. 2, the battery case 13 mainly comprises a battery tray 14 and a battery cover 15.

Figure 3:
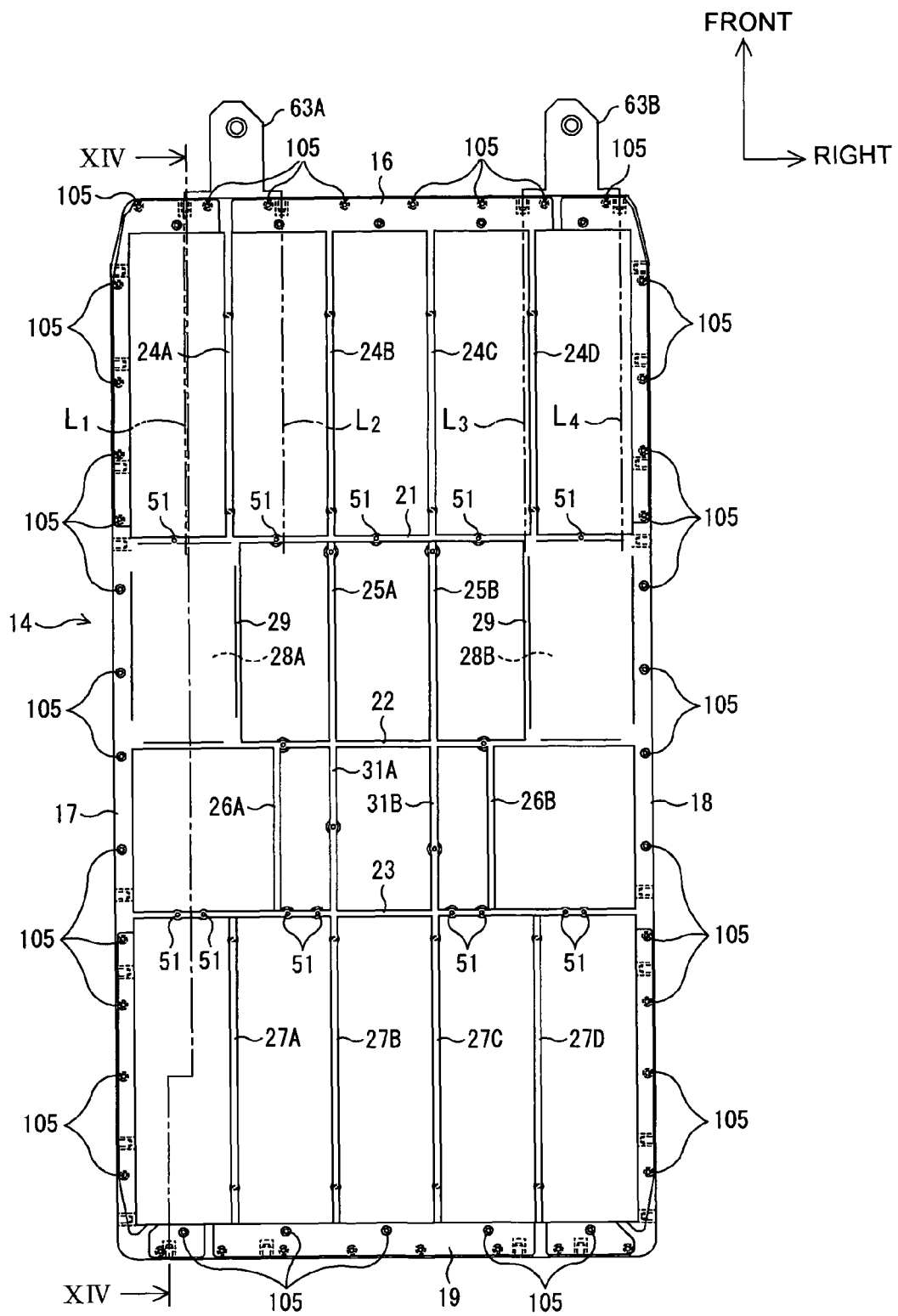
FIG. 3 is a top view schematically showing a battery tray in the embodiment of the present invention.

As shown in FIG. 3, a front-end wall (second resin wall) 16, a left-end wall (third resin wall) 17, a right-end wall 18, a rear-end wall 19, a front partition 21, a middle partition 22 and a rear partition 23 are fixed in the battery tray 14.

The front partition 21, the middle partition 22 and the rear partition 23 are walls extending between the left-end wall 17 and the right-end wall 18 in the left-right direction of the battery tray 14.

The front partition 21 is disposed at the front of the middle partition 22. The rear partition 23 is disposed at the rear of the middle partition 22.

Further, in the battery tray 14, front-battery partitions 24A, 24B, 24C and 24D are fixed. The front-battery partitions 24A, 24B, 24C and 24D are walls extending between the front-end wall 16 and the front partition 21 in the longitudinal direction (front-rear direction). Particularly, front-battery partitions 24A and 24D are also called first resin walls.

Furthermore, in the battery tray 14, rear-battery partitions 27A, 27B, 27C and 27D are fixed. The rear-battery partitions 27A, 27B, 27C and 27D are walls extending between the rear-end wall 19 and the rear partition 23 in the front-rear direction.

Still further, in the battery tray 14, front reinforcing walls 25A and 25B and concave side walls 29 and 29 are formed. The front reinforcing walls 25A and 25B are walls extending between the front partition 21 and the middle partition 22 in the front-rear direction. The concave side walls 29 and 29 are walls to individually make concave portions 28A and 28B.

Between the rear partition 23 and the middle partition 22, middle-battery partitions 26A and 26B are formed which walls extend in the front-rear direction.

Further, between the middle partitions 26A and 26B, rear reinforcing walls 31A and 31B are formed which walls extend in the front-rear direction.

Figure 4:
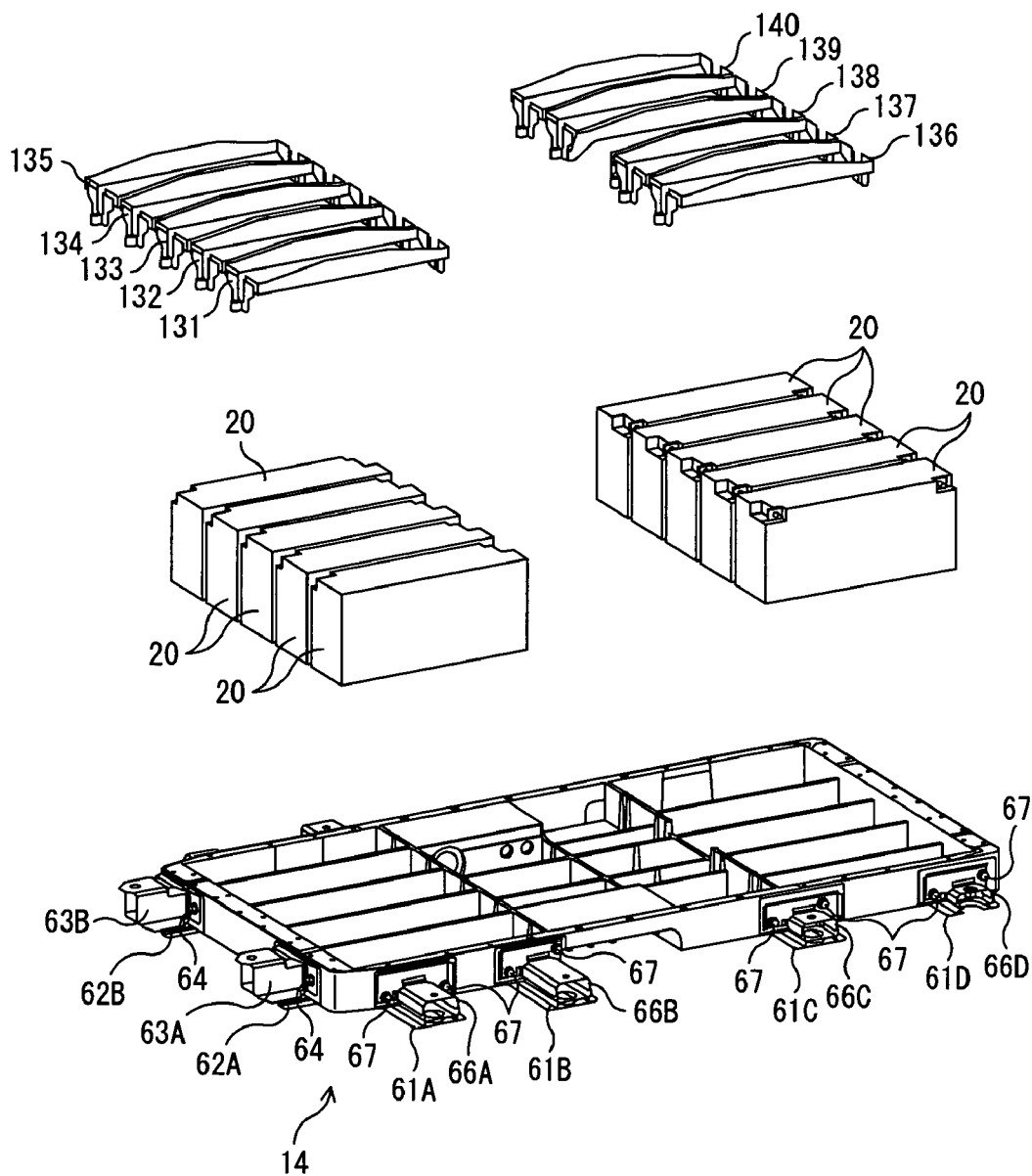
FIG. 4 is a schematic perspective view mainly showing batteries in a battery case and a battery holder in the embodiment of the present invention.

As shown in FIG. 4, batteries 20 are fixed securely inside the battery case 13 in such a way that after the batteries 20 are individually disposed at the correct positions on the battery tray 14, the batteries 20 are supported by battery holders (not shown), then the battery holders are fixed to the battery tray 14 by bolts (not shown).

Figure 5:
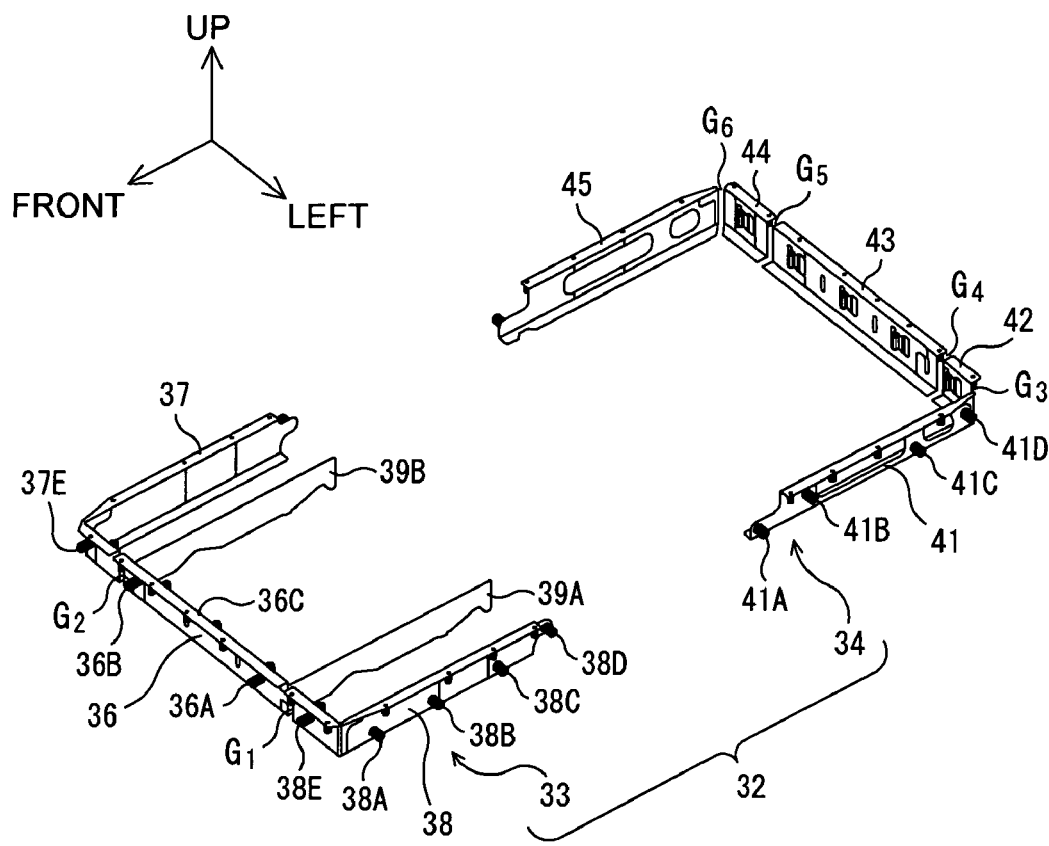
FIG. 5 is a schematic perspective view mainly showing metal frames built into a battery tray in the embodiment of the present invention.

As shown in FIG. 5, in the battery tray 14, a frame set (also called 'metal frame') 32 is included. The frame set (framework member) 32, which is made from iron, mainly comprises front frame set (front framework) 33 and rear frame set (rear framework) 34.

Figure 21:
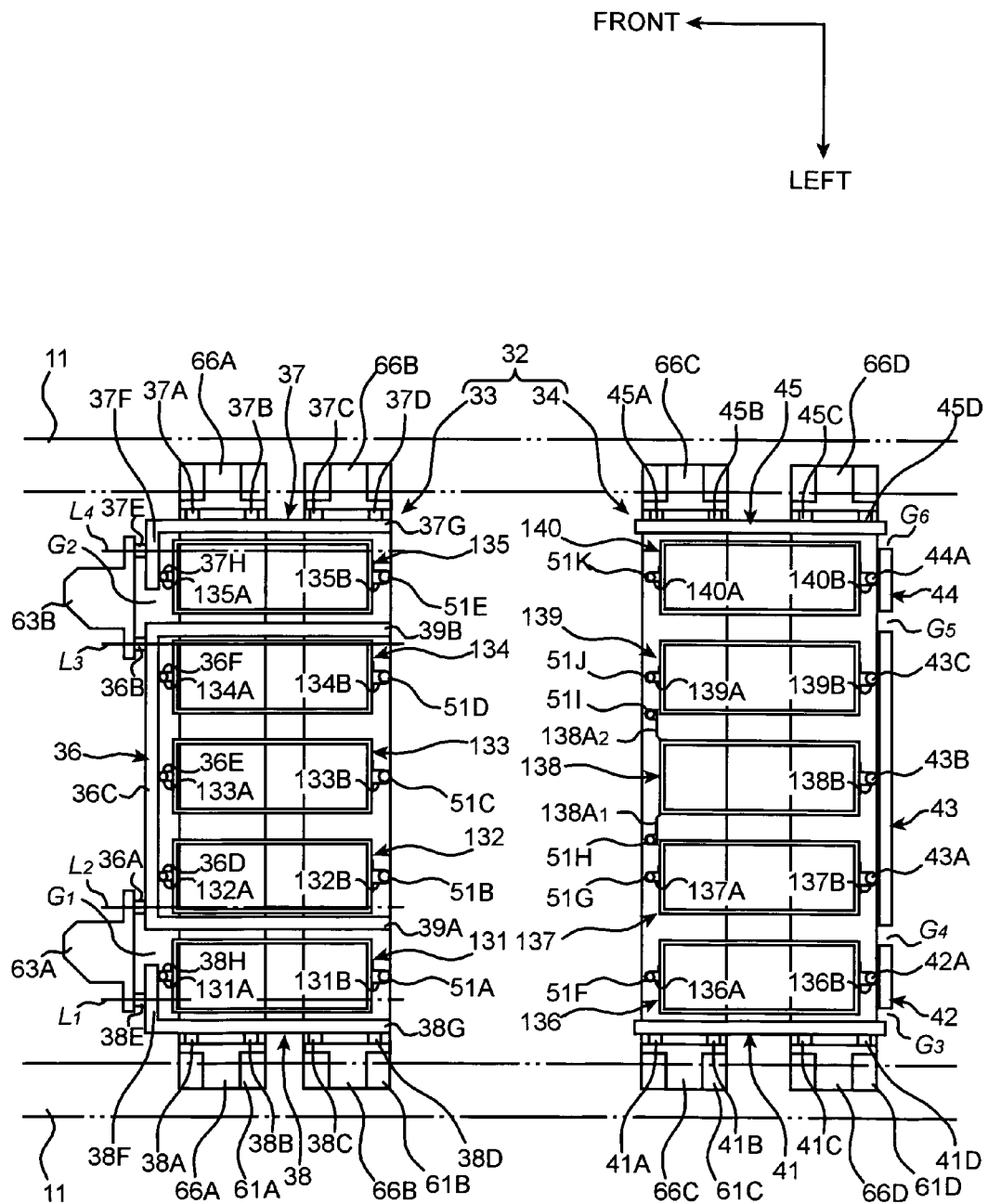
FIG. 21 is a schematic diagram showing the connecting structures connected by metal parts in the embodiment of the present invention.

As shown in FIG. 21, the side members 11, the battery cross member 12, the metal frame 32, the front blocks 63A and 63B, and the lateral crash-proof blocks 66A, 66B, 66C and 66D, which are metal parts, interconnect with each other directly or indirectly so that the rigidity of the battery case 13 is increased.

The front frame set 33 includes a front-left frame 38, a front-middle frame 36 and a front-right frame 37.

The front-left frame (third metal reinforce) 38 which is an L-shaped member integrally formed by a front-left metal portion (side portion) 38G and a front-left-front metal portion (front portion) 38F.

The front-left metal portion 38G is embedded in the left-end wall 17 (shown in FIG. 3) of the battery tray 14. The front-left-front metal portion 38F is embedded in the front-end wall 16 (also shown in FIG. 3) of the battery tray 14.

On a left surface of the front-left metal portion 38G, nuts 38A, 38B, 38C and 38D are welded. On a front surface of the front-left-front metal portion 38F, nut 38E is welded. Further, on a rear surface of the front-left-front metal portion 38F, nut 38H is welded.

The front-right frame (third metal reinforce) 37 which is an L-shaped member integrally formed by a front-right metal portion (side portion) 37G and a front-right-front metal portion (front portion) 37F.

The front-right metal portion 37G is embedded in the right-end wall 18 (shown in FIG. 3) of the battery tray 14. The front-right-front metal portion 37F is embedded in the front-end wall 16 (also shown in FIG. 3) of the battery tray 14.

On a right surface of the front-right metal portion 37G, nuts 37A, 37B, 37C and 37D are welded. On a front surface of the front-right-front metal portion 37F, nut 37E is welded. Further, on a rear surface of the front-right-front metal portion 37F, nut 37H is welded.

The front-middle frame (third front frame) 36 which is a U-shaped member integrally formed by an A-reinforce (first metal-wall reinforce) 39A and 39B and a B-reinforce (second metal-wall reinforce) 36C.

The B-reinforce 36C, which is embedded in the front-end wall 16 and extends in the transversal direction, interconnects the A-reinforces 39A and 39B. On a front surface of the B-reinforce 36C, nuts 36A and 36B are welded. Further, on a rear surface of the B-reinforce 36C, nuts 36D, 36E and 36F are welded.

As shown in FIG. 21, the left side of the A-reinforce 39A is embedded in the front-battery partition (first resin wall) 24A and is disposed on the rear side of the front-A block (also called crash-proof block, first crash-proof block or connecting member) 63A and is between imaginary lines $L_1$ and $L_2$ The imaginary line $L_1$ extends in the transversal direction through the nut 38E at which point the left front block 63A and the front-left-front metal portion 38F are connected.

The imaginary line $L_2$ extends in the transversal direction through the nut 36A at which point the left front block 63A and the front-middle frame 36 are connected.

The right side of the A-reinforce 39B, which is embedded in the front-battery partition (first resin wall) 24D and is disposed at the rear side of the front-B block (also called crash-proof block, first crash-proof block or connecting member) 63B, is disposed between imaginary lines $L_3$ and $L_4$.

The imaginary line $L_3$ extends in the transversal direction through the nut 36B at which point the right front block 63B and the front-middle frame 36 are connected. The imaginary line $L_4$ extends in the transversal direction through the nut 37E at which point the right front block 63B and the front-right-front metal portion 37F are connected.

The front-left frame 38 is distanced from the front-middle frame 36 by gap $G_1$. Likewise, the front-right frame 37 is distanced from the front-middle frame 36 by gap $G_2$.

The left front block 63A is fixed to the nut 36A welded on the B-reinforce 36C of the front-middle frame 36 by a bolt 67. Further, the left front block 63A is fixed to the nut 38E welded on the front-left-front metal portion 38F of the front-left frame 38 by another bolt 67. Additionally, the left front block 63A is fixed to the battery cross member 12 by a bolt (not shown).

Likewise, the right front block 63B is fixed to the nut 36B welded on the B-reinforce 36C of the front-middle frame 36 by a bolt 67. Further, the right front block 63B is fixed to the nut 37E welded on the front-right-front metal portion 37F of the front-right frame 37 by another bolt 67. Additionally, the right front block 63B is fixed to the battery cross member 12 by a bolt (not shown).

Next, the rear frame set 34 will be described in detail as follows.

As shown in FIGS. 5 and 21, the rear frame set 34 includes a rear-lateral-left frame 41, a rear-end-left frame 42, a rear-end-middle frame 43, a rear-end-right frame 44 and a rear-lateral-right frame 45.

The rear-lateral-left frame (first or second rear frame) 41 is embedded in the left-end wall 17 (shown in FIG. 3). Nuts 41A, 41B, 41C and 41D are welded on a left surface of the rear-lateral-left frame 41.

Likewise, the rear-lateral-right frame (second or first rear frame) 45 is embedded in the right-end wall 18 (shown in FIG. 3). Nuts 45A, 45B, 45C and 45D are welded on a right surface of the rear-lateral-right frame 45.

The rear-end-left frame 42, the rear-end-middle frame 43 and the rear-end-right frame 44 are embedded in the rear-end wall 19 (shown in FIG. 3). Nut 42A is welded on the rear-end-left frame 42. Nuts 43A, 43B and 43C are welded on the rear-end-middle frame 43. Nut 44A is welded on the rear-end-right frame 44.

A gap $G_3$ is formed between the rear-lateral-left frame 41 and rear-end-left frame 42. A gap $G_4$ is formed between the rear-end-left frame 42 and the rear-end-middle frame 43. A gap $G_5$ is formed between the rear-end-middle frame 43 and rear-end-right frame 44. Further, a gap $G_6$ is formed between the rear-end-right frame 44 and the rear-lateral-right frame 45.

As shown in FIGS. 4 and 21, in the battery case 13, battery holders 131-140 hold batteries 20 individually. A set of the battery holders 131-135 is disposed on a forward side of the battery case 13. Another set of the battery holders 136-140 is disposed at the rear of the battery case 13.

In the front set of the battery holders 131-135, the left most battery holder 131 is called front-A battery holder 131, and the battery holder 132, which is located on the right side of the front-A battery holder 131, is called front-B battery holder 132.

On the other side, the rightmost battery holder 135 is called front-E battery holder 135, and the battery holder 134, which is located on the left side of the front-E battery holder 135, is called front-D battery holder 134.

Further, the battery holder 133, which is located between the front-B battery holder 132 and the front-D battery holder 134, is called front-C battery holder 133.

Likewise, in the rear set of the battery holders 136-140, the leftmost battery holder 136 is called rear-A battery holder 136, and the battery holder 137, which is located on the right side of the rear-A battery holder 136, is called rear-B battery holder 137.

On the other side, the rightmost battery holder 140 is called rear-E battery holder 140, and the battery holder 139, which is located on the left side of the rear-E battery holder 140, is called rear-D battery holder 139.

Further, the battery holder 138, which is located between the rear-B battery holder 137 and the rear-D battery holder 137, is called rear-C battery holder 138.

The front-A battery holder 131 has a front sleeve 131A communicating with the nut 38H welded on the front-left frame 38.

Further, the front-A battery holder 131 has a rear sleeve 131B communicating with an upper opening 52A of a built-in nut 51A which will be described later referring to FIG. 6.

A bolt (not shown) is inserted into the front sleeve 131A and is engaged with the nut 38H. Likewise, another not-shown bolt is inserted into the rear sleeve 131B and is engaged with the built-in nut 51A.

The front-B battery holder 132 has a front sleeve 132A communicating with the nut 36D welded on the front-middle frame 36.

Additionally, the front-B battery holder 132 has a rear sleeve 132B communicating with an upper opening 52A of a built-in nut 51B.

A bolt (not shown) is inserted into the front sleeve 132A and is engaged with the nut 36D. Likewise, another not-shown bolt is inserted into the rear sleeve 132B and is engaged with the built-in nut 51B.

The front-C battery holder 133 has a front sleeve 133A communicating with the nut 36E welded on the front-middle frame 36.

Further, the front-C battery holder 133 has a rear sleeve 133B communicating with an upper opening 52A of a built-in nut 51C.

An unillustrated bolt is inserted into the front sleeve 133A and is engaged with the nut 36E. Likewise, another not-shown bolt is inserted into the rear sleeve 133B and is engaged with the built-in nut 51C.

The front-D battery holder 134 has a front sleeve 134A communicating with the nut 36F welded on the front-middle frame 36.

Additionally, the front-D battery holder 134 has a rear sleeve 134B communicating with an upper opening 52A of a built-in nut 51D.

An unshown bolt is inserted into the front sleeve 134A and is engaged with the nut 36F. Also, another unshown bolt is inserted into the rear sleeve 134B and is engaged with the built-in nut 51D.

The front-E battery holder 135 has a front sleeve 135A communicating with the nut 37H welded on the front-right frame 37.

Further, the front-E battery holder 135 has a rear sleeve 135B communicating with an upper opening 52A of a built-in nut 51E.

A bolt (not shown) is inserted into the front sleeve 135A and is engaged with the nut 37H. Further, another not-shown bolt is inserted into the rear sleeve 135B and is engaged with the built-in nut 51E.

On the other side, the rear-A battery holder 136 has a rear sleeve 136B communicating with the nut 42A welded on the rear-end-left frame 42.

Additionally, the rear-A battery holder 136 has a front sleeve 136A communicating with an upper opening 52A of a built-in nut 51F.

An unshown bolt is inserted into the rear sleeve 136B and is engaged with the nut 42A. Also, another unshown bolt is inserted into the front sleeve 136A and is engaged with the built-in nut 51F.

The rear-B battery holder 137 has a rear sleeve 137B communicating with the nut 43A welded onto the rear-end-middle frame 43, and has a front sleeve 137A communicating with an upper opening 52A of a built-in nut 51G.

An unillustrated bolt is inserted into the rear sleeve 137B and is engaged with the nut 43A. Also, another unillustrated bolt is inserted into the front sleeve 137A and is engaged with the built-in nut 51G.

The rear-C battery holder 138 has a rear sleeve 138B communicating with the nut 43B welded on the rear-end-middle frame 43, and has a front sleeve $138A_1$, which communicates with an upper opening 52A of a built-in nut 51H, and another front sleeve $138A_2$, which communicates with an upper opening 52A of a built-in nut 51I.

A bolt (not shown) is inserted into the rear sleeve 138B and is engaged with the nut 43B. Further, other bolts (not shown) are individually inserted into the front sleeve $138A_1$ and $138A_2$ and are engaged with the built-in nuts 51H and 51I.

The rear-D battery holder 139 has a rear sleeve 139B communicating with the nut 43C welded onto the rear-end-middle frame 43, and has a front sleeve 139A communicating with an upper opening 52A of a built-in nut 51J.

An unillustrated bolt is inserted into the rear sleeve 139B and is engaged with the nut 43C. Further, another bolt (not shown) is inserted into the front sleeve 139A and is engaged with the built-in nuts 51J.

The rear-E battery holder 140 has a rear sleeve 140B communicating with the nut 44A welded on the rear-end-right frame 44, and has a front sleeve 140A communicating with an upper opening 52A of a built-in nut 51K.

An unshown bolt is inserted to the rear sleeve 140B and is engaged with the nut 44A. Further, another not shown bolt is inserted to the front sleeve 140A and is engaged with the built-in nuts 51K.

Each lower edge of a front set of the built-in nuts 51A-51E is fixed by an unillustrated bolt to a lateral-end supporting member 61B which will be described later.

Likewise, each lower edge of a rear set of the built-in nuts 51F-51K is fixed by unillustrated bolt to a C-supporting member 61C which will also be described later.

As described above, the rear-end-left frame 42 is fixed to the C-supporting member 61C via the rear-A battery holder 136 and the built-in nut 51F.

Also, the rear-end-middle frame 43 is fixed to the C-supporting member 61C via the rear-B battery holder 137, the built-in 51G, the rear-C battery holder 138, the built-in nuts 51H and 51I, the rear-D battery holder 139 and the built-in bolt 51J.

Likewise, the rear-end-right frame 44 is fixed to the C-supporting member 61C via the rear-E battery holder 140 and the built-in nut 51K.

Figure 6:
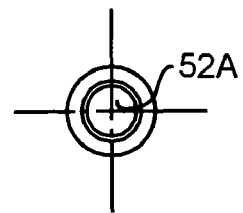
FIG. 6 (A) is a top view schematically showing a built-in nut in the embodiment of the present invention.
Figure 6:
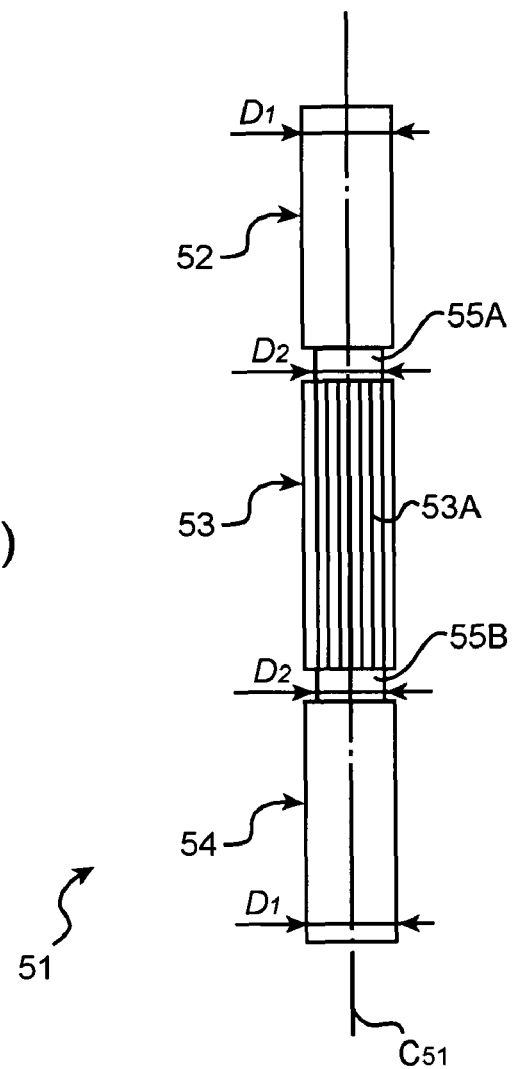
Figure 6:
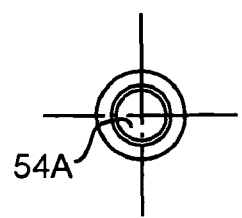
Figure 7:
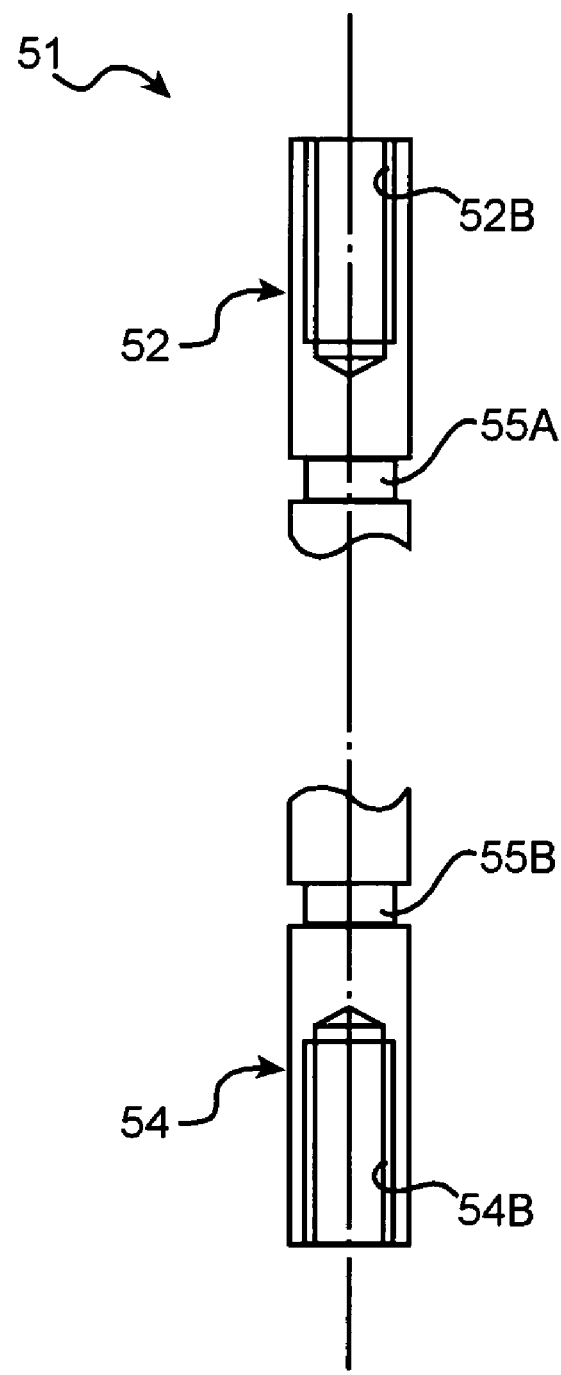
FIG. 7 is a cross-section view schematically showing the same built-in nut in the embodiment of the present invention.

A built-in nut 51 shown in FIG. 6 (A), (B), (C) and FIG. 7 is embedded in the battery tray 14.

The built-in nut 51 shown in FIG. 6 (A), (B), (C) and FIG. 7 is identical with each of the built-in nuts 51A, 51B, 51C, 51D, 51E and 51F.

The iron built-in nut 51 mainly comprises an upper nut 52, a middle stem 53 and a lower nut 54.

The upper nut 52 is a cylindrical part which extends in the vertical direction and has an upper opening 52A which opens upwardly. Inside the upper nut 52, a bolt groove 52B is formed.

The lower nut 54 is identical to the upper nut 52 except that the upper nut 52 is in an upside-down position. In other words, the lower nut 54 is also a cylindrical part which extends in the vertical direction and has a lower opening 54A which opens downwardly. Inside the lower nut 54, a bolt groove 54B is formed.

The middle stem 53 is a cylindrical part between the upper nut 52 and the lower nut 54. On the surface of the middle stem 53, a plurality of notches (serrated portion) 53A are formed.

Between the upper nut 52 and the middle stem 53, an upper constriction 55A is formed. Also, between the middle stem 53 and the lower nut 54, a lower constriction 55B is formed.

The upper constriction 55A and the lower constriction 55B are cylindrical parts whose outer diameter (second diameter) $D_2$ is smaller than the outer diameter (first diameter) $D_1$ of the upper nut 52, the lower nut 54 and the middle stem 53.

Because of the serrated portion 53A formed on the middle stem 53, it is possible to avoid loosening and spinning of the built-in nut 51 embedded in the battery tray 14 even if a rotational torque is inputted to the built-in nut 51 around the center axis $C_{51}$.

Further, according to the upper constriction 55A and the lower constriction 55B, it is possible to avoid the built-in nut 51 dropping from the battery tray 14 even if the force is inputted to the built-in nut 51 along the direction of the center axis $C_{51}$.

Figure 8:
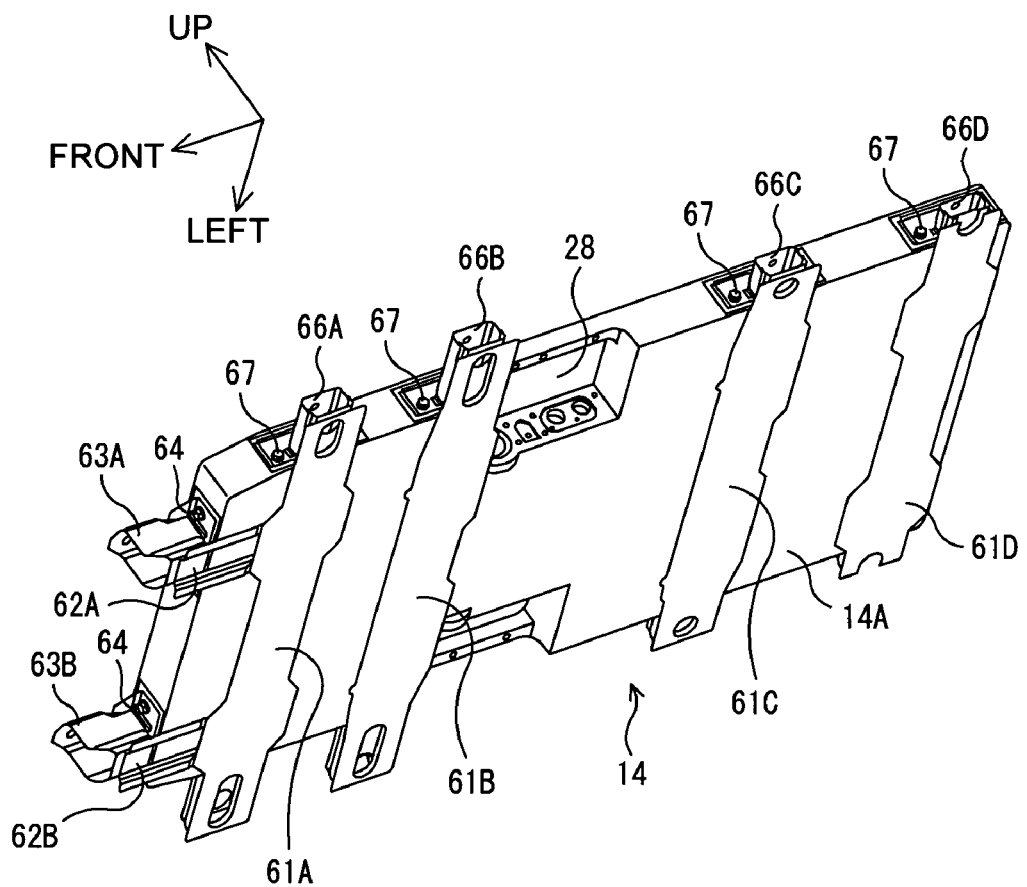
FIG. 8 is a schematic perspective view showing the bottom side of the battery case in the embodiment of the present invention.
Figure 9:
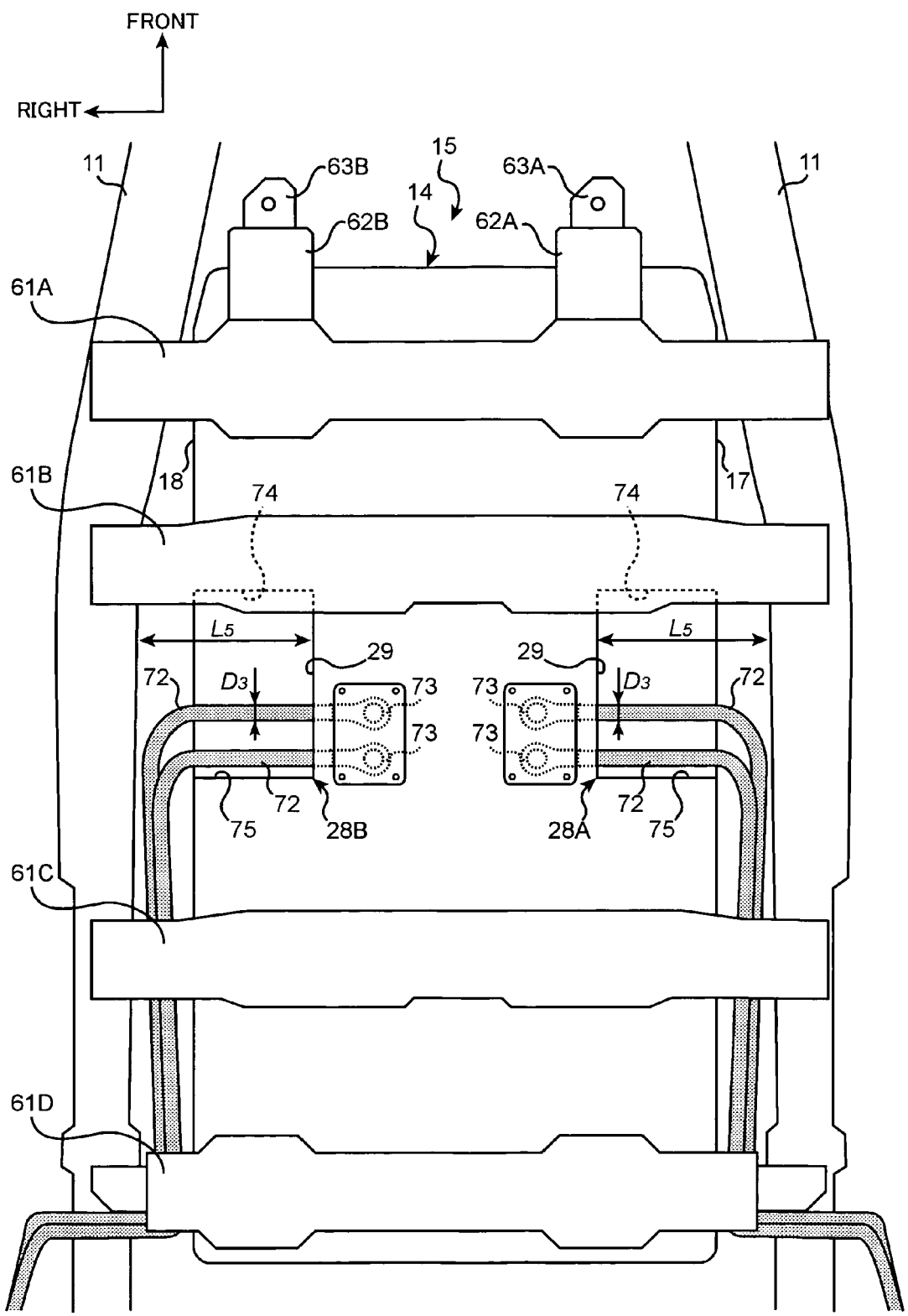
FIG. 9 is a perspective view schematically showing the bottom side of the battery case in the embodiment of the present invention.

As shown in FIG. 8 and FIG. 9, lateral-end supporting members (also called 'supporting members' or 'first supporting members') 61A, 61B, 61C and 61D are fixed to the bottom surface 14A of the battery tray 14.

The lateral-end supporting member 61A is disposed at the front row called an A-supporting member 61A.

The lateral-end supporting member 61B disposed rear of the A-supporting member 61A is called a B-supporting member 61B.

Further, the lateral-end supporting member 61C disposed rear of the B-supporting member 61B is called a C-supporting member 61C. Likewise, the lateral-end supporting member 61D disposed rear of the C-supporting member 61C is called a D-supporting member 61D.

As shown in FIG. 1, each of the lateral-end supporting members 61A, 61B, 61C and 61D extends in the transversal direction connecting between the side members 11 and 11 to support the bottom surface 14A. The lateral-end supporting members 61A, 61B, 61C and 61D are made from iron.

As shown in FIG. 8, on the A-supporting member 61A, front-end supporting members (also called 'supporting members' and 'second supporting members') 62A and 62B are fixed. Each of the front-end supporting members 62A and 62B is a part which extends in the longitudinal direction of the vehicle 10 and is projected forward from the front end of battery tray 14.

Figure 10:
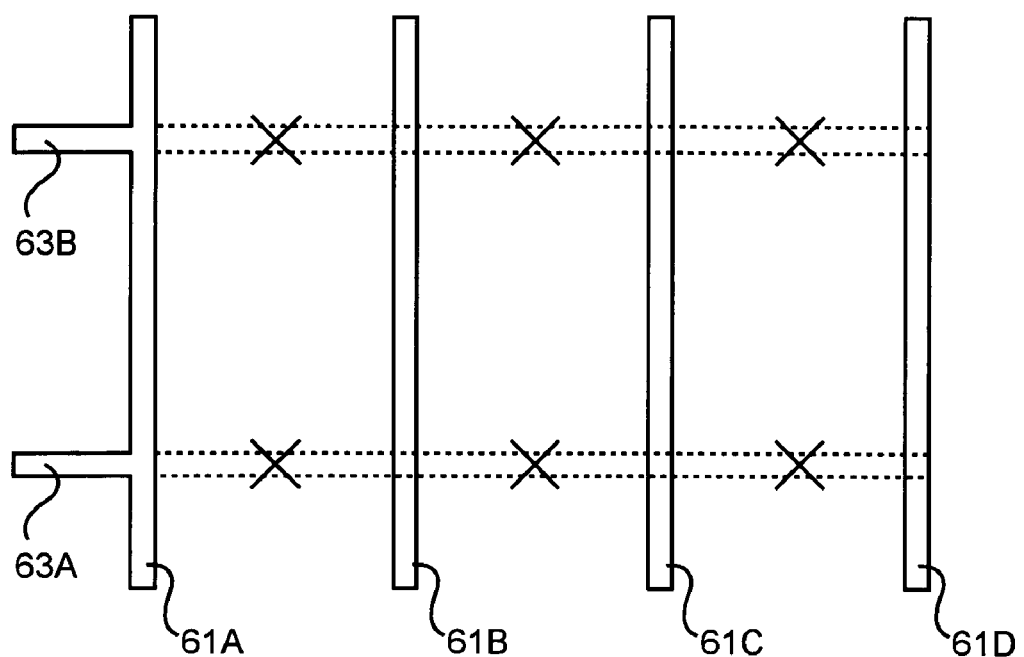
FIG. 10 is a schematic view showing lateral-end supporting members and a front-end supporting member in the embodiment of the present invention.

As shown in FIG. 10, the front-end supporting members 62A and 62B are only connected to the A-supporting member 61A and are not connected to the B-supporting member 61B, C-supporting member 61C and D-supporting member 61D (see 'X' in FIG. 10).

As shown in FIG. 1, the front-end supporting members 62A and 62B connect between the battery cross member 12 and A-supporting member 61A via front blocks 63A and 63B which will be described just below. In addition, the front-end supporting members 62A and 62B are made from iron.

On the front-end supporting members 62A and 62B, each of the front blocks (also called 'crash-proof blocks' or 'first crash-proof blocks') 63A and 63B is welded respectively. The front blocks 63A and 63B are fixed to the front-end wall 16 by bolts 64 (shown in FIG. 8) and are fixed to the battery cross member 12 by bolts 65 (shown in FIG. 1).

In other words, the front blocks 63A and 63B are parts which individually connect between the battery cross member 12 and the A-supporting member 61A and are disposed between the battery cross member 12 and the battery tray 14. Further, the front blocks 63A and 63B are made from iron.

As shown in FIG. 1, lateral-end supporting members (also called "crash-proof blocks', 'second crash-proof blocks' or 'connecting member) 66A, 66B, 66C and 66D are respectively welded on both ends of each of the lateral-end supporting members 61A, 61B, 61C and 61D.

The lateral crash-proof block 66A fixed on the A-supporting member 61A is called an A-lateral crash-proof block (front second crash-proof block) 66A. The lateral crash-proof block 66B fixed on the B-supporting member 61B is called a B-lateral crash-proof block (front second crash-proof block) 66B. The lateral crash-proof block 66C fixed on the C-supporting member 61C is called a C-lateral crash-proof block (rear second crash-proof block) 66C.

The lateral crash-proof block 66D fixed on the D-supporting member 61D is called a D-lateral crash-proof block (rear second crash-proof block) 66D.

As shown in FIG. 8, the lateral crash-proof blocks 66A, 66B, 66C and 66D are fixed to the left-end wall 17 and the right-end wall 18 of the battery tray 14 by bolts 67, and are fixed to the side members 11 and 11 by bolts 68.

As shown in FIG. 2, the lateral crash-proof blocks 66A, 66B, 66C and 66D, which connect between side member 11 and the battery case 13, are respectively disposed between the bottom surface of the side member 11 and the lateral-end supporting members 61A, 61B, 61C and 61D. Each of the lateral crash-proof blocks 66A, 66B, 66C and 66D is made from iron and is a hollow square pillar in shape.

Further, each of the A-lateral crash-proof block 66A and the B-lateral crash-proof block 66B is directly fixed to the side member 11, whereas, the C-lateral crash-proof block 66C is fixed to the side member 11 via a C-connecting block 69C. Also, the D-lateral crash-proof block 66D is fixed to the side member 11 via a D-connecting block 69D.

Although the side member 11 is extended from a point (shown as an arrow A in FIG. 2) backwardly and upwardly, the battery tray 14 is kept in a horizontal position because the C-connecting block 69C is interposed between the side member 11 and the C-supporting member 61C, also the D-connecting block 69D is interposed between side member 11 and the D-supporting member 61D.

Figure 11:
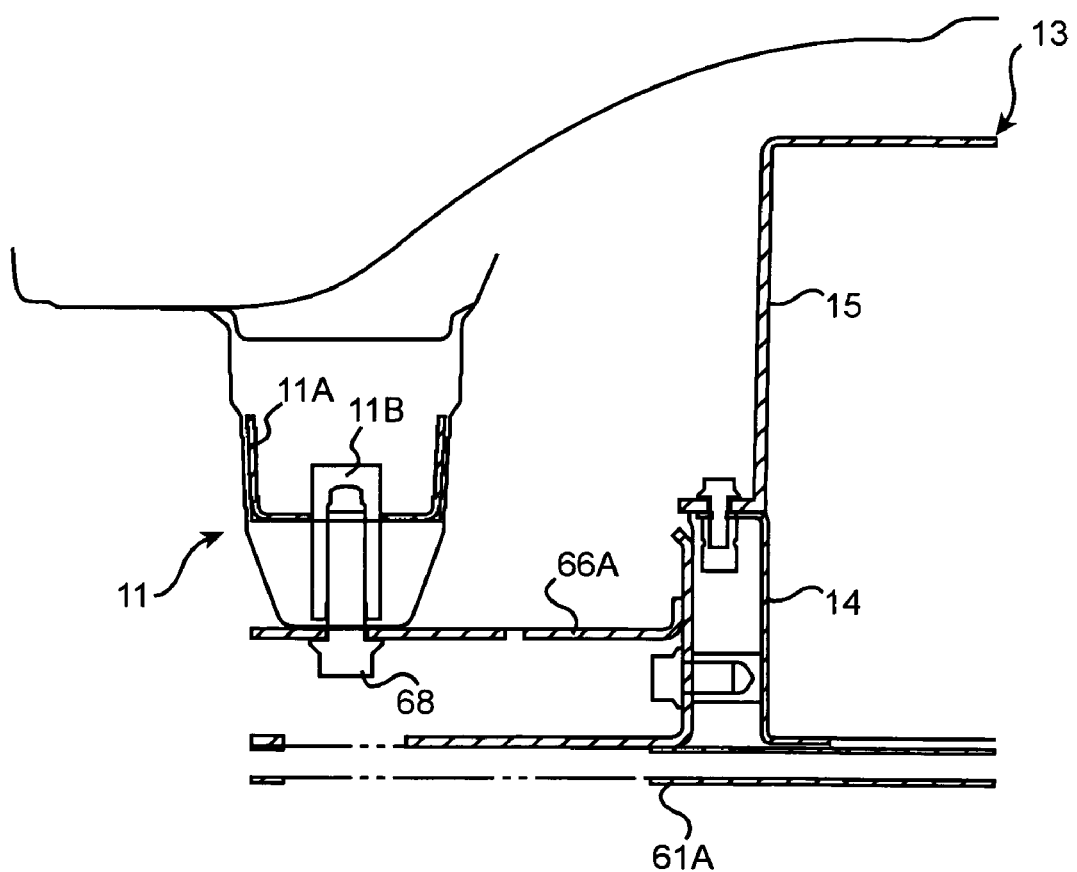
FIG. 11 is a cross-section view indicated XI-XI in FIG. 1 schematically showing a part of the structure in the embodiment of the present invention.

As shown in FIG. 11, the A-supporting member 61A is fixed by the bolt 68 engaged with a cap nut 11B mounted in the reinforcing member 11A of the side member 11. The B-supporting member 61B is also fixed to the side member 11 by the structure shown in FIG. 11, description of which is omitted in the drawings.

Figure 12:
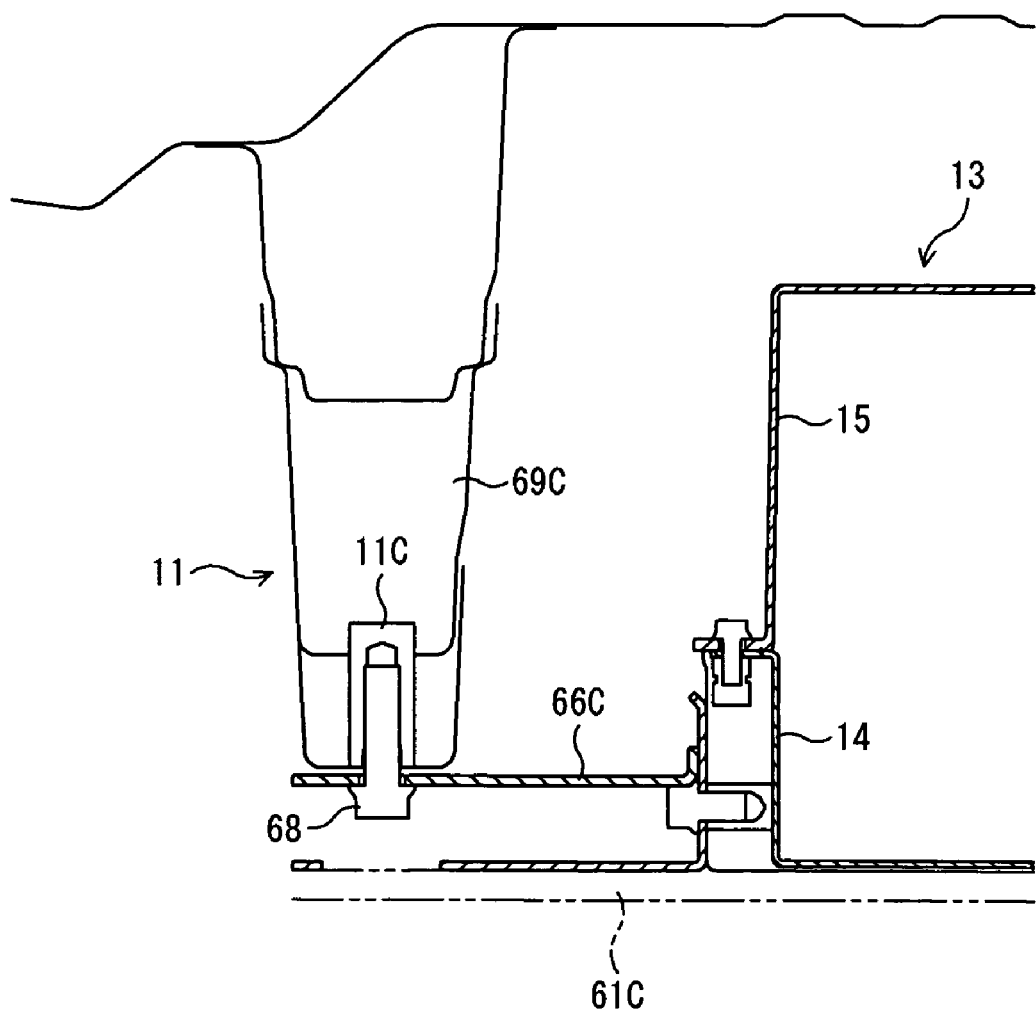
FIG. 12 is a cross-section view indicated XII-XII in FIG. 1 schematically showing a part of the structure in the embodiment of the present invention.

As shown in FIG. 12, the C-supporting member 61C is connected to the side member 11 via the C-connecting block 69C. The C-connecting block 69C is a hollow iron part in which a cap nut 11C is mounted. The C-supporting member 61C is fixed to the C-connecting block 69C by the bolt 68 engaged with the cap nut 11C.

Figure 13:
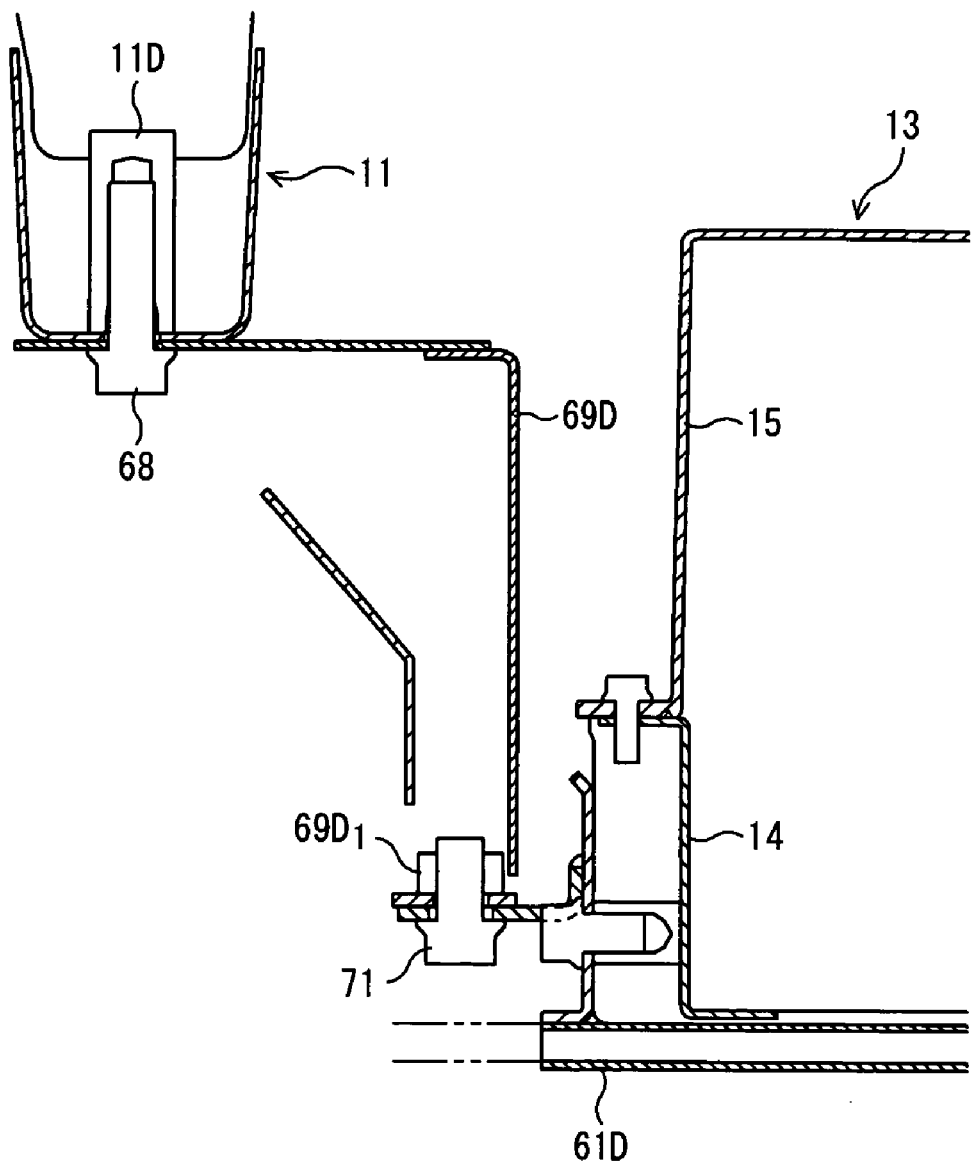
FIG. 13 is a cross-section view indicated XIII-XIII in FIG. 1 schematically showing a part of the structure in the embodiment of the present invention.

As shown in FIG. 13, the D-supporting member 61D is connected to the side member 11 via the D-connecting block 69D. The D-connecting block 69D is a hollow iron part. The D-connecting block 69D is fixed to the side member 11 by the bolt 68 engaged with the cap nut 11D mounted in the side member 11.

Further, a nut $69D_1$ is welded on the bottom of the D-connecting block 69D. The D-supporting member 61D is fixed to the D-connecting block 69D by a bolt 71 which engages with the nut $69D_1$.

As shown in FIG. 9, between the left-end wall 17 of the battery tray 14 and the side member 11 and between the right-end wall 18 of the battery tray 14 and the side member 11, two high-voltage cables 72 are respectively disposed. The high-voltage cables 72, which are capable of carrying about 300V, connect between the batteries 20 mounted in the battery case 13 and an inverter (also called 'external device) not shown in the drawings.

Each of the high-voltage cables 72 has a hole connector 73 connected to an electric-output socket (not shown) in the battery case 13.

At both the lateral surface of the battery tray 14 facing the side members 11 (namely, at the left-end wall 17 and the right-end wall 18) and the bottom surface 14A of the battery tray 14, dent portions 28A and 28B are formed.

Each of the dent portions 28A and 28B has a concave side wall 29, which extends parallel to the side member 11, a concave front wall 74, which extends from the front end of the concave side wall 29 in the lateral direction, and a concave rear wall 75, which extends from the rear end of the concave side wall 29 in the lateral direction.

Figure 14:
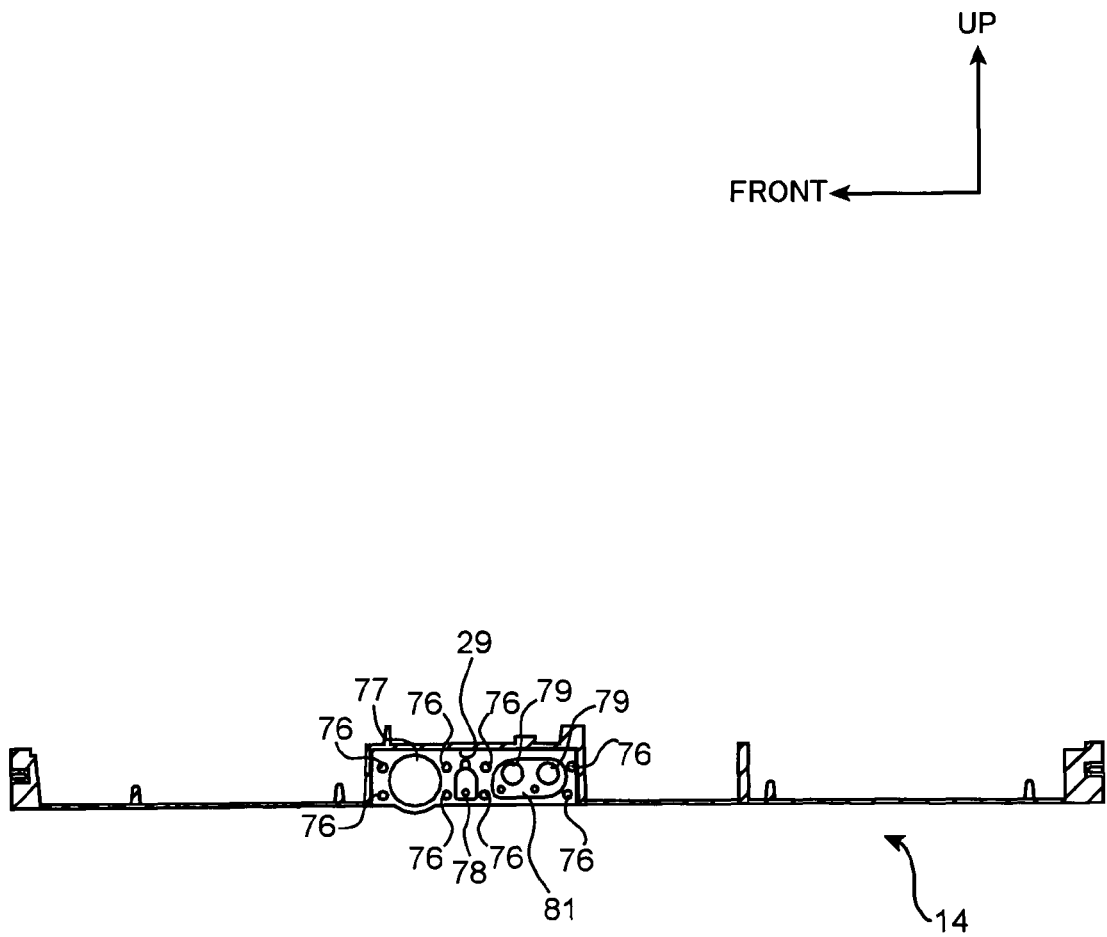
FIG. 14 is a cross-section view indicated XIV-XIV in FIG. 1 schematically showing a part of the structure in the embodiment of the present invention.

Further, as shown in FIG. 14, casing bolt-hole portions 76, a casing low-voltage cable hole portion 77, a casing center-hole portion 78 and a casing high-voltage cable hole portion 79 are formed at the concave side wall 29.

Figure 15:
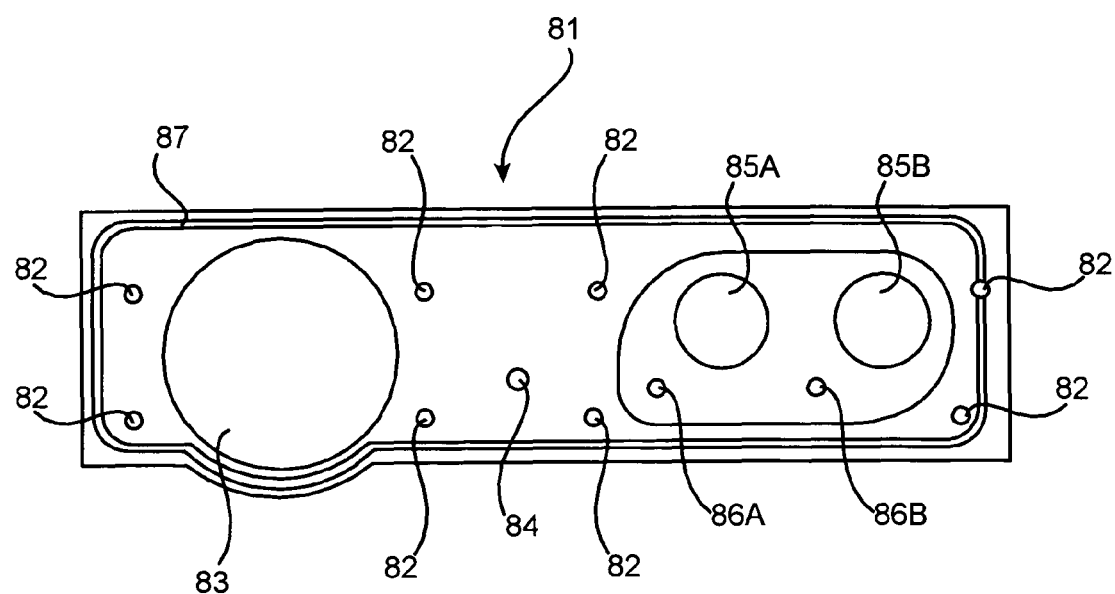
FIG. 15 is a front view schematically showing a cover plate in the embodiment of the present invention.

A cover plate 81 shown in FIG. 15 is fixed on the back surface of the concave side wall 29. Cover plate 81 will be described below in detail.

Each of the casing bolt-hole portions 76 shown in FIG. 14 is a hole through which a plate fixing bolt (not shown) is engaged with a plate bolt-hole portion 82 formed on the cover plate 81.

Low-voltage cables 89 (shown in FIG. 16) used for supplying about 12V electric power to electrical equipment pass through the casing low-voltage cable hole portion 77. Further, the casing low-voltage cable hole portion 77 communicates with a plate low-voltage cable hole portion 83 formed at the cover plate 81.

The casing center hole portion 78 communicates with a venting hole 84 formed at the cover plate 81.

High-voltage cable 72 (shown in FIG. 9) passes through each of the casing high-voltage cable hole portions 79 and 79. The casing high-voltage cable hole portions 79 and 79 respectively communicate with plate high-voltage cable hole portions 85A and 85B formed at the cover plate 81.

Further, each concave side wall 29 is kept at a distance $L_5$ (shown in FIG. 9) defined based on the outer diameter $D_3$ of the high-voltage cable 72 from the side member 11.

The greater the outer diameter $D_3$ (thickness) of the high-voltage cable 72, the greater distance $L_5$ between the concave side wall 29 and the side member 11 becomes to permit bending of cable 72. Conversely, the smaller outer diameter $D_3$, the shorter distance $L_5$ may be.

As shown in FIG. 15, the cover plate 81 is fixed to the back surface of concave side wall 29 of the battery tray 14. The cover plate 81 is a plate made from aluminum covering the casing bolt-hole portions 76, the casing low-voltage cable hole portion 77, the casing center hole portion 78 and the casing high-voltage cable hole portions 79 as discussed with reference to FIG. 14.

Aluminum is used for cover plate 81 because both rigidity and weight saving are required, and it is also necessary to avoid detachment between the cover plate 81 and battery tray 14 even if the resin material of battery tray 14 expands or contracts due to temperature variation.

One point the inventors have focused attention on is that the linear expansion coefficients of the main material of the battery tray 14 which is polybutylene resin including glass fiber and the material of the cover plate 81 which is aluminum, are almost the same, and accordingly, the cover plate 81 is made from aluminum.

At the cover plate 81, the plate bolt-hole portions 82, the plate low-voltage cable hole portion 83, the venting hole 84 and the plate high-voltage hole portions (cable hole portions) 85A and 85B are formed.

Figure 17:
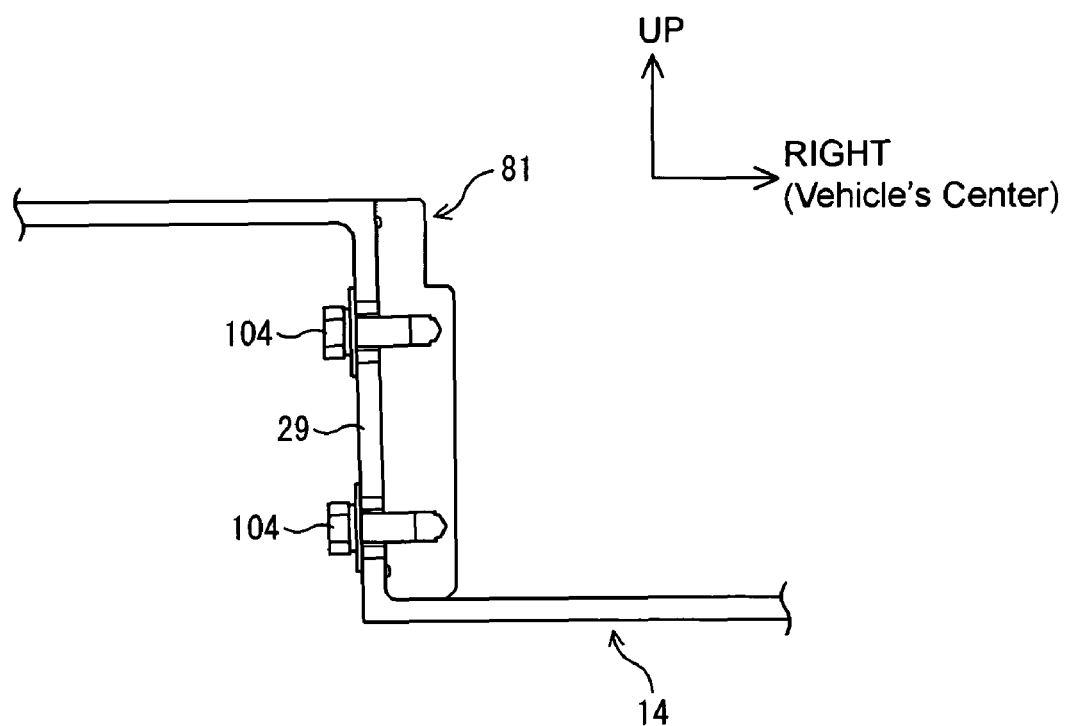
FIG. 17 is a cross-section view indicated XVII-XVII in FIG. 16 schematically showing a part of the structure in the embodiment of the present invention.

Each of the plate bolt-hole portions 82 is a hole in which each of the plate fixing bolts 104 shown in FIG. 17 are engaged.

The plate bolt-hole portions 82 open to the front side (near side in FIG. 15) of the cover plate 81. However, the plate bolt-hole portions 82 do not open to the back (far side in FIG. 15) of the cover plate 81.

Consequently, the cover plate 81 is not penetrated by the plate bolt-hole portions 82.

Figure 16:
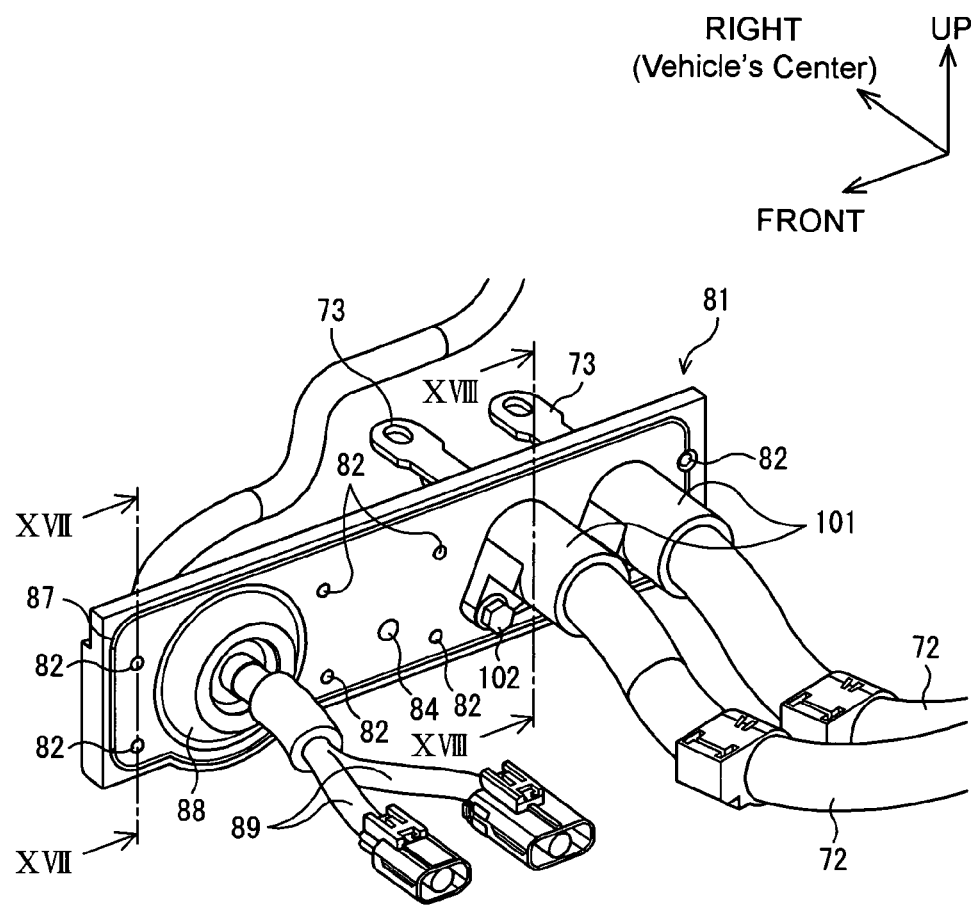
FIG. 16 is a perspective schematic view mainly showing the cover plate in the embodiment of the present invention.

In the plate low-voltage cable hole portion 83, as shown in FIG. 16, a rubber cap 88 is fitted. The low-voltage cables 89 are inserted through the rubber cap 88.

The venting hole 84 is a hole for venting air from the battery case 13 when the air pressure increases in the battery case 13.

In venting hole 84, a one-way valve (not shown) is fitted, thereby maintaining airtightness in the battery case 13.

Figure 18:
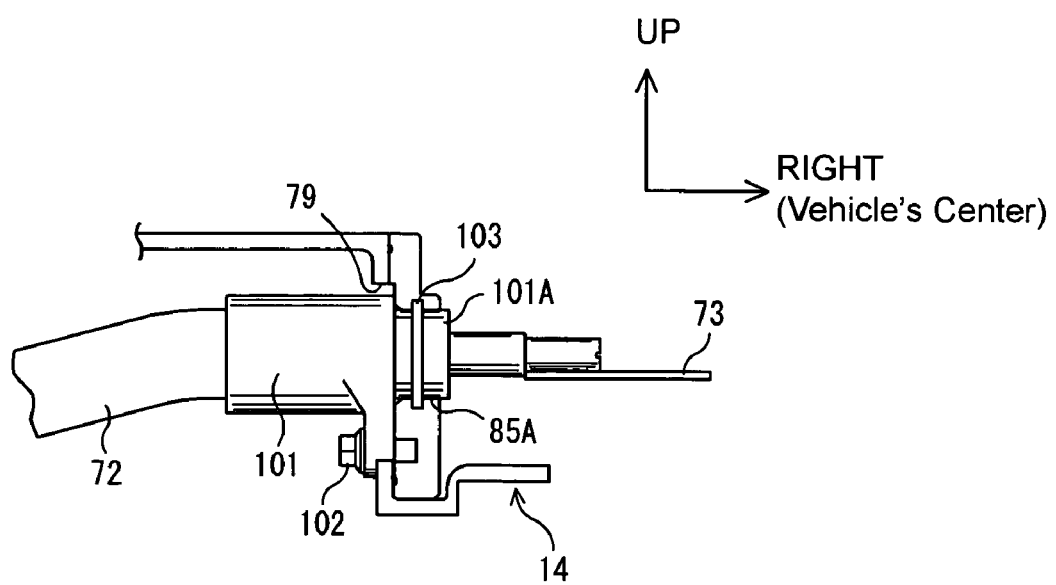
FIG. 18 is a cross-section view indicated XVIII-XVIII in FIG. 16 schematically showing a part of the structure in the embodiment of the present invention.

As shown in FIG. 15 and FIG. 18, each of the plate high-voltage cable hole portions 85A and 85B is a hole into which individual socket ends 101A and 101A of cable holders 101 and 101 are inserted. The plate high-voltage cable hole portions 85A and 85B are respectively communicated with the casing high-voltage cable hole portions 79 and 79 shown in FIG. 14.

Into the cable holders 101 and 101, each of the high-voltage cables 72 and 72 is individually inserted.

Each of the socket ends 101A and 101A of the cable holders 101 and 101 has a rubber O-shaped ring 103 individually equipped to secure airtightness in the battery case 13.

The cable holders 101 and 101 are fixed to the cover plate 81 by holder fixing bolts 102 and 102, respectively. The holder fixing bolts 102 and 102 are bolts which are individually engaged with cable holder hole portions 86A and 86B.

The cable holder hole portions 86A and 86B are holes which are respectively formed adjacent to the plate high-voltage cable hole portions 85A and 85B.

The cable holder hole portions 86A and 86B open to the front side of the cover plate 81 and do not open to the back side of the cover plate 81.

The inner surface of each of the plate high-voltage cable hole portions 85A and 85B is mirror finished so that the O-shaped ring 103 fits each of the plate high-voltage cable hole portions 85A and 85B without leaving a gap.

Further, because of the mirror finished inner surface, it is possible to protect the O-shaped ring 103 from any damage when the O-shaped ring 103 is inserted into each of the plate high-voltage cable hole portions 85A and 85B.

Additionally, a sealing groove 87 is formed around the outer edge of the cover plate 81. Sealing agent (not shown) is filled into sealing groove 87 to avoid leaving a gap between the concave side wall 29 of the battery tray 14 and the cover plate 81 as shown in FIG. 17.

Figure 19:
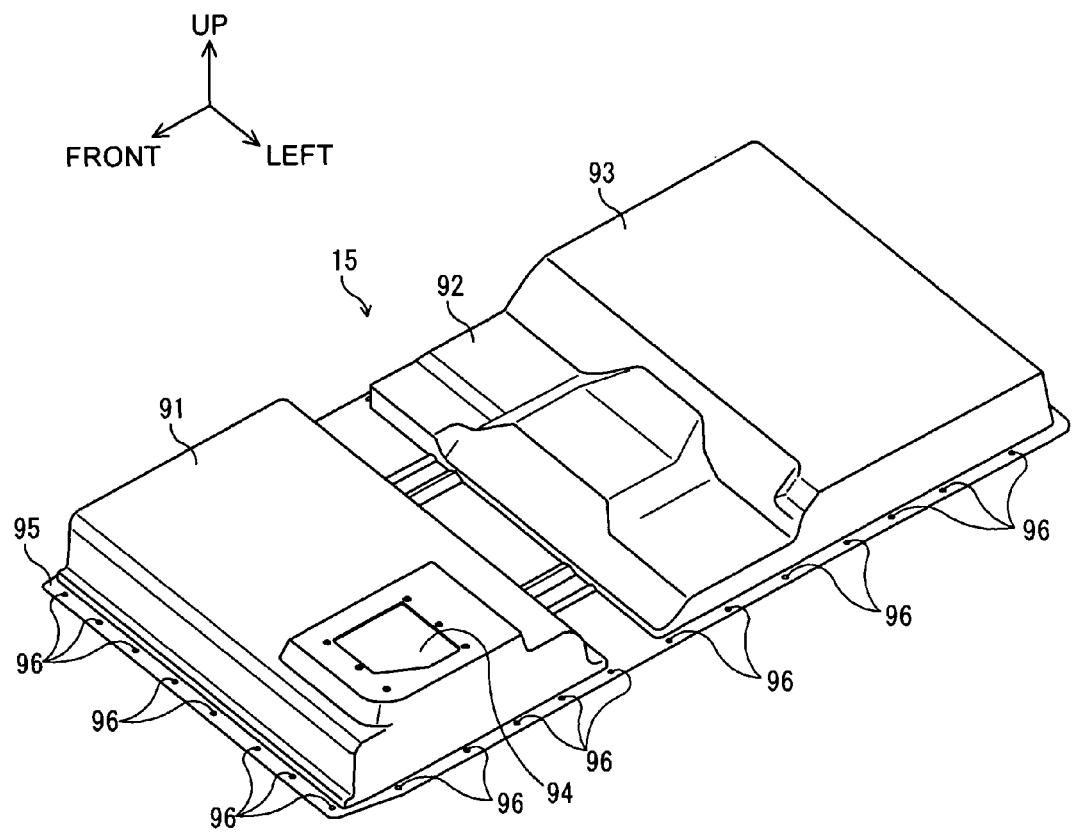
FIG. 19 is a perspective view schematically showing a battery cover in the embodiment of the present invention.
Figure 20:
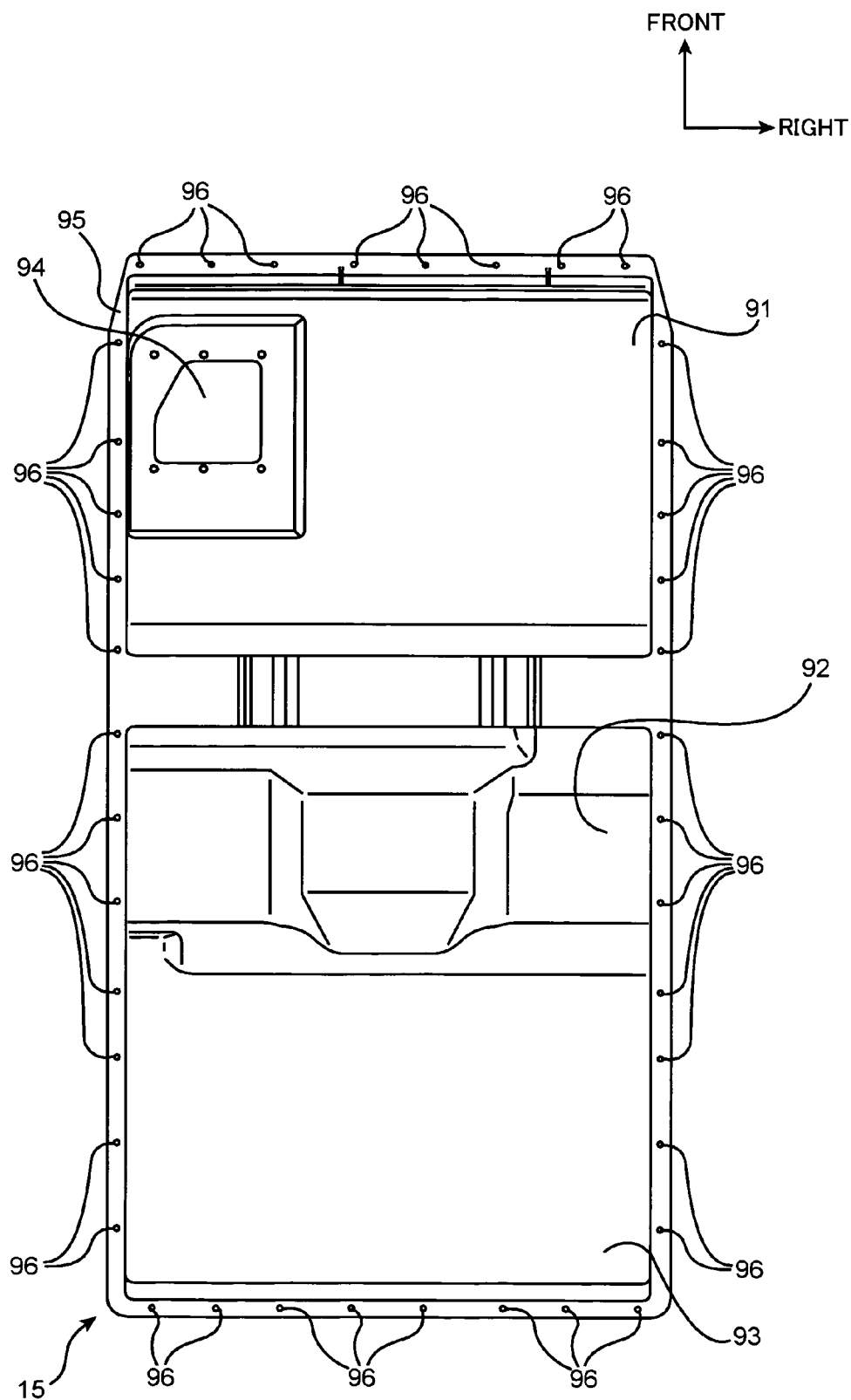
FIG. 20 is a top view schematically showing the battery cover in the embodiment of the present invention.

As shown in FIG. 19 and FIG. 20, the battery cover 13 has a front raised portion 91, a middle raised portion 92 and a rear raised portion 93.

The front raised portion 91 is a portion which is raised near the front end of the battery cover 13.

The rear raised portion 93 is a portion which is raised near the rear end of the battery cover 13. On the front raised portion 91, a maintenance hole portion 94 is formed.

The maintenance hole portion 94 is formed for maintaining inside the battery case 13 and is normally covered by a covering plate (not shown).

The middle raised portion 92 is a portion which is raised between the front raised portion 91 and the rear raised portion 93, however, the middle raised portion 92 is lower than the front raised portion 91 and the rear raised portion 93 in height.

A flange 95, on which cover bolt hole portions 96 are formed, is formed around the edge of the battery cover 13.

As shown in FIG. 3, tray bolt hole portions 105, corresponding to the location of the cover bolt hole portions 96, are formed on the front-end wall 16, the left-end wall 17, right-end wall 18, and rear-end wall 19 of the battery tray 14 (namely, around the edge of battery tray 14).

According to this arrangement, the cover bolt hole portions 96 and the tray bolt hole portions 105 respectively communicate with each other when the battery cover 15 is put on the battery tray 14. Thus, it is allowed that bolts (not shown) are individually inserted into the cover bolt hole portions 96 and the tray bolt hole portions 105 to fix the battery tray 14 and the battery cover 15.

Namely, the embodiment of the present invention can provide the following effects or/and advantages.

For example, if the front side of the electric vehicle 10 is crashed, the battery case 13 containing batteries 20 moves forward due to inertia. Particularly, the batteries 20 are comparatively heavy, therefore, it is impossible to omit kinetic energy of the battery case 13 when the electric vehicle 10 is crashed.

However, according to the present invention in this embodiment, it is possible to avoid the battery case 13 moving forward and being crashed against the battery cross member 12 because the lateral-end supporting members 61A, 61B, 61C and 61D and the front-end supporting members 62A and 62B are provided.

Namely, it is possible to maintain the gap (see $G_F$ in FIG. 1) between the battery case 13 and the battery cross member 12 even if the electric vehicle 10 is crashed, and therefore, it is possible to avoid damage to cables (not shown) installed in the gap $G_F$ so that the reliability of the electric vehicle 10 is improved.

The front-end supporting members 62A and 62B are not connected to all of the lateral-end supporting members 61A, 61B, 61C and 61D, however, the front-end supporting members 62A and 62B are connected to only the lateral-end supporting member 61A which is disposed at the front row. Accordingly, it is possible to reduce the length of the front-end supporting members 62A and 62B, and therefore, it is possible to suppress the weight and cost of front-end supporting members 62A and 62B in weight and cost.

Namely, it is possible to improve crash-resisting capability of the batteries 20 mounted on the electric vehicle 10 while preventing increased weight and cost.

Further, the lateral-end supporting members 61A, 61B, 61C and 61D and front-end supporting members 62A and 62B are made from iron. In addition, the battery case 13 is made from polybutylene resin including glass fibers. According to this arrangement, it is possible to reduce the weight of the battery case 13 at a reasonably low cost in mass production. Further, it is also possible to improve the mounting stiffness of the battery case 13 in relation to the electric vehicle 10.

The battery case 13 containing the batteries 20 is robustly supported by the lateral-end supporting members 61A, 61B, 61C and 61D, and further, the front blocks 63A and 63B prevent collision of the battery case 13 with the battery cross member 12 if the battery case 13 moves forward due to inertia even if the front side of the vehicle 10 is crashed.

Further, the lateral crash-proof blocks 66A, 66B, 66C and 66D are inserted between the side surface of the battery case 13 and the side member 11, and accordingly, it is possible to avoid a collision of the battery case 13 with the side member 11 if the battery case 13 moves laterally due to inertia even if the lateral side of the vehicle 10 is crashed.

Namely, it is possible to keep the gap (see $G_S$ and $G_S$ in FIG. 1) between the battery case 13 and the side members 11, therefore, it is possible to prevent damage of the high-voltage cables 72 and low-voltage cables 89 installed in the gap $G_S$ and $G_S$ so that the reliability of the electric vehicle 10 is improved.

Additionally, the lateral-end supporting members 61A, 61B, 61C and 61D, the front-end supporting members 62A and 62B, the front blocks 63A and 63B and the battery cross member 12 are made from iron. Further, the battery case 13 is made from polybutylene resin including glass fibers.

According to this arrangement, it is possible to reduce the weight of the battery case 13 at a reasonably low cost in mass production. Further, it is also possible to improve the mounting rigidity of the battery case 13 on the electric vehicle 10.

The front-end supporting members 62A and 62B and the battery cross member 12 are connected via the front blocks 63A and 63B. Further, the lateral-end supporting members 61A, 61B, 61C and 61D and the side members 11 are connected via the lateral crash-proof blocks 66A, 66B, 66C and 66D. According to this arrangement, it is possible to lower the center of gravity of the battery case 13 containing the heavy batteries 20.

Further, due to inserting the front blocks 63A and 63B between the battery case 13 and the battery cross member 12 and inserting the lateral-end supporting members 66A, 66B, 66C and 66D between the battery case 13 and the side members 11, it is possible to avoid collision with the cross member 12 or the side member 11 if the battery case 13 moves due to inertia even if the vehicle 10 is crashed.

Therefore, it is possible to improve the crash-resistant capability of the batteries 20 mounted on the electric vehicle 10.

Namely, if the front side of the electric vehicle 10 is crashed, it is possible to avoid collisions with the battery cross member 12 if the battery case 13 moves forward due to inertia. Likewise, if the lateral side of the electric vehicle 10 is crashed, it is possible to avoid collision with the side members 11 if the battery case 13 moves laterally due to inertia.

As discussed previously with FIG. 9, the high-voltage cables 72 and 72 are individually inserted into the plate high-voltage cable hole portions 85A and 85B formed at the cover plates 81 respectively fixed on the dent portions 28A and 28B of the battery case 13. Further, the high-voltage cables 72 and 72, which are disposed between the side members 11 and the battery case 13, are curved in an arc shape with a bending radius.

Further, each of the concave side walls 29 of the dent portions 28A and 28B is distanced $L_5$, which is defined corresponding to the outer diameter $D_3$ of the high-voltage cable 72, from the side member 11. Accordingly, it is possible to avoid damaging the high-voltage cables 72 due to bending the high-voltage cables 72 with excessively small radius and it is also possible to avoid wasting the space in the battery case 13 due to curving the high-voltage cables 72 with excessively large radius.

In other words, it is possible to easily install the high-voltage cables 72 connected to the batteries 20 mounted on the electric vehicle 10 while utilizing limited space in the electric vehicle 10.

Further, the high-voltage cables 72 are connected to the batteries 20 via the hole connectors 73, and accordingly, it is possible to secure the connection between the high-voltage cables 72 and the batteries 20 at a lower cost.

Particularly, it is possible to avoid unwanted disconnection of the high-voltage cables 72 from the batteries 20 due to using the hole connectors 73 to connect between the batteries 20 and the high-voltage batteries 20 as compared with using conventional detachable connectors.

Therefore, it is possible to improve the reliability of the electric vehicle 10 by preventing accidental disconnection between the high-voltage cables 72 and the batteries 20.

Further, it is possible to reduce cost and weight of the electric vehicle 10 by using the hole connectors 73 as compared with using conventional detachable connectors.

Each of the high-voltage cables 72 is drawn from inside the battery case 13 through the plate high-voltage cable hole portions 85A and 85B formed at the aluminum cover plate 81, and accordingly, it is possible to avoid excessively varying the inner diameter of the plate high-voltage cable hole portions 85A and 85B due to variation of air temperature.

Further, it is possible to avoid external air flowing into the battery case 13 due to sealing by each O-shaped ring 103 between the outer surface of the high-voltage cables 72 and 72 and the inner surface of the plate high-voltage cable hole portions 85A and 85B.

Additionally, although the plate bolt-hole portions 82 open to the front side of the cover plate 81, the plate bolt-hole portions 82 do not open to the back side of the cover plate 81, and accordingly, it is possible to secure the airtightness in the battery case 13 while allowing the plate fixing bolts 104, for fixing the cover plate 81 to the battery case 13, to be engaged with the plate bolt-hole portions 82.

As shown in FIG. 6 and FIG. 7, portions whose outer diameter is locally small (second diameter $D_2$) at the built-in nut 51, namely, the upper constriction 55A and the lower constriction 55B in which resin of battery tray 14 is entered. Accordingly, it is possible to avoid the built-in nut 51 dropping from the battery tray 14 even if force is vertically inputted to the built-in nut 51.

Further, due to the serrated portion 53A formed on the middle stem 53, it is possible to avoid spinning of the built-in nut 51 embedded in the battery tray 14 even if torque is inputted to the built-in nut 51 to rotate the built-in nut 51 around the center axis $C_{51}$, accordingly, it is possible to surely engage the bolt (not shown) with the built-in nut 51.

If the front side of the electric vehicle 10 is impacted, the battery case 13 will exhibit forward movement due to inertia. Consequently, such an impact is exerted on the battery case 13 through the front blocks 63A and 63B. In this case, the front-battery partitions 24A and 24D, which are disposed behind the front blocks 63A and 63B, and the additional plates 39A and 39B, which are embedded in the front-battery partitions 24A and 24D, may absorb the impact.

Therefore, it is possible to improve crash-resisting capability of the batteries 20 mounted on the electric vehicle 10 while preventing increased weight and cost.

Further, it is possible to further improve the rigidity of the battery case 13 because the B-reinforce 36C, which is embedded in the front-end wall 16 which is made from resin and forms front edge of the battery 14, connects the pair of additional plates 39A and 39B.

Additionally, the A-reinforces 39A and 39B and the B-reinforce 36C are embedded in the battery tray 14 and consequently it is possible to keep the inside of battery case 13 airtight.

Furthermore, gap $G_1$ is formed between the front-left frame 38 and the front-middle frame 36, and gap $G_2$ is formed between the front-right frame 37 and the front-middle frame 36. Accordingly, it is possible to adapt to design changes of the battery case 13, and it is possible to flow resin material into a mold when the battery case 13 is formed.

The left front block 63A connects the battery cross member 12, the front-left frame 38 and B-reinforce 36C. Likewise, the right front block 63B connects the battery cross member 12, the front-right frame 37 and B-reinforce 36C. Consequently, it is possible to improve further the rigidity of battery case 13 while preventing an increased number of parts.

The iron metal frame 32, which is embedded in the resin battery case 13 containing batteries 20, and the side frame 11 are connected by the lateral crash-proof blocks 66A, 66B, 66C and 66D which are made from iron. Further, the iron metal frame 32 embedded in the resin battery case 13 and the battery cross member 12 are connected by the front blocks 63A and 63B also made from iron. According to this arrangement, it is possible to increase rigidity of the battery case 13 while reducing weight of the battery case 13, and it is also possible to improve the crash-resisting capability of the batteries 20 mounted on the electric vehicle 10.

Further, it is possible to adapt to design changes of the battery case 13 thanks to the metal frame 32 consisting of two separate frames, the front frame set 33 and the rear frame set 34.

It is possible to keep the essential rigidity of the battery case 13 by interconnecting the front frame set 33 and the rear frame set 34 via the side member 11.

Even if the lateral side of the electric vehicle 10 is crashed, it is possible that collision of the battery case 13 with the side member 11 will be prevented by the lateral crash-proof blocks 66A, 66B, 66C and 66D.

The front frame set 33 consists of a separate front-left frame 38, front-right frame 37 and front-middle frame 36, so accordingly, it is possible to adapt to design changes of the battery case 13. Further, it is possible to flow resin material into a mold when the battery case 13 is formed.

The front-left frame 38 and the front-middle frame 36 are connected by the left front block 63A fixed to the battery cross member 12, and the front-right frame 37 and the front-middle frame 36 are connected by the right front block 63B fixed to the battery cross member 12. In other words, the front-left frame 38, the front-right frame 37, the front-middle frame 36, the side member 11 and the battery cross member 12 are all iron parts, and are all connected. Therefore, the rigidity of battery case 13 is further enhanced.

The rear frame set 34 consists of a separate rear-lateral-left frame 41, rear-end-left frame 42, rear-end-middle frame 43, rear-end-right frame 44 and rear-lateral-right frame 45, and accordingly, it is possible to adapt to design changes of the battery case 13. Further, it is possible to flow resin material into a mold when the battery case 13 is formed.

The C-supporting member 61C and the rear-end-left frame 42 are connected by the battery holder 136, and the C-supporting member 61C and the rear-end-middle frame 43 are connected by the battery holders 137, 138 and 139. Further, the C-supporting member 61C and the rear-end-right frame 44 are connected by the battery holder 140. According to these arrangements, it is possible to connect all iron parts which are the rear-lateral-left frame 41, the rear-end-left frame 42, the rear-end-middle frame 43, the rear-end-right frame 44, the rear-lateral-right frame 45 and the side member 11, and therefore, it is possible to further improve the rigidity of battery case 13.

The present invention is not limited to the above embodiment, but covers all changes and modifications which do not constitute departures from the spirit and scope of the invention.

In the above embodiment, the side member 11, the battery cross member 12, the metal frame 32, the front blocks 63A and 63B and lateral crash-proof blocks 66A, 66B, 66C and 66D are made from iron. However, it is acceptable to make these parts with a non-iron metal (i.e. aluminum or titanium).

From the invention thus described, it will be obvious that the same may be varied in many ways. Such variations are not regarded as a departure from the spirit and scope of the invention, and all such modifications as would be obvious to one skilled in the art are intended to be included within the scope of the following claims.

What is claimed is:

1. A structure for mounting a battery to an electric vehicle comprising:
    a body member which is made from metal and which forms a body of the electric vehicle;
    a battery case which is made from resin and which includes the battery containing electric power for driving the electric vehicle and which has end walls that surround and define a compartment in which the battery is installed;
    a framework member which is made from metal and which is embedded in said battery case and extending along a longitudinal direction of at least one of the end walls of said battery case;
    a battery holder supporting the battery and being fixed to the framework member; and
    a connecting member which is made from metal and connects said framework member and said body member.

2. The structure for mounting the battery to the electric vehicle according to claim 1 wherein
    said body member includes
        a pair of first body members extending in a longitudinal direction of the electric vehicle, and
        a second body member which connects said pair of first body members and which, extending in a transversal direction of the electric vehicle,
    said battery case is disposed between said pair of first body members and is disposed rearward of said second body member,
    said framework member includes
        a front framework, and
        a rear framework, which is independent from said front framework, being disposed rearward of said front framework, and
    said connecting member includes,
        a pair of front second crash-proof blocks individually connecting said pair of first body members and said front framework, and
        a pair of rear second crash-proof blocks individually connecting said pair of first body members and said rear framework.

3. The structure for mounting the battery to the electric vehicle according to claim 2 wherein
    said connecting member includes a first crash-proof block connecting between said front framework and said second body member.

4. The structure for mounting the battery to the electric vehicle according to claim 3
    wherein said front framework includes,
        a first front frame being connected to one of said front second crash-proof blocks,
        a second front frame being connected to another of said front second crash-proof
        a third front frame being disposed between said first front frames and said second front frames,
        each of said first front frame, said second front frame and said third front frame is formed as an individual element,
    said first crash-proof block includes,
        a front-A block which is a metal block and which connects said second body member, said first front frame and said third front frame, and
        a front-B block which is a metal block and which connects said second body member, said second front frame and said third front frame.

5. The structure for mounting the battery to the electric vehicle according to claim 4, further comprising:
    a first supporting member, which is a metal member fixed to a bottom of said battery case and is extended in a width direction of the electric vehicle, interconnecting between said pair of rear second crash-proof blocks,
    wherein said rear framework includes, a first rear frame being connected with one of said rear second crash-proof blocks which is fixed to one of said first body members, a second rear frame being connected with another of said rear second crash-proof blocks which is fixed to another of said first body members and a third rear frame being disposed between said first rear frame and said second rear frame, each of said first rear frame, said second rear frame and said third rear frame is an individual element, said battery holder is made from metal and connects said third rear frame and said first supporting member.

6. The structure for mounting the battery to the electric vehicle according to claim 2, further comprising:
a first supporting member, which is a metal member fixed to a bottom of said battery case and is extended in a width direction of the electric vehicle, interconnecting between said pair of rear second crash-proof blocks,
wherein said rear framework includes,
a first rear frame being connected with one of said rear second crash-proof blocks which is fixed to one of said first body members,
a second rear frame being connected with another of said rear second crash-proof blocks which is fixed to another of said first body members and
a third rear frame being disposed between said first rear frame and said second rear frame,
each of said first rear frame, said second rear frame and said third rear frame is an individual element,
said battery holder is made from metal and connects said third rear frame and said first supporting member.

7. The structure for mounting the battery to the electric vehicle according to claim 3, further comprising:
a first supporting member, which is a metal member fixed to a bottom of said battery case and is extended in a width direction of the electric vehicle, interconnecting between said pair of rear second crash-proof blocks,
wherein said rear framework includes,
a first rear frame being connected with one of said rear second crash-proof blocks which is fixed to one of said first body members,
a second rear frame being connected with another of said rear second crash-proof blocks which is fixed to another of said first body members and
a third rear frame being disposed between said first rear frame and said second rear frame,
each of said first rear frame, said second rear frame and said third rear frame is an individual element,
said battery holder is made from metal and connects said third rear frame and said first supporting member.

8. The structure for mounting the battery to the electric vehicle according to claim 1, wherein
said battery case includes a battery cover and a battery tray, and
said end walls are fixed in the battery tray.

9. The structure for mounting the battery to the electric vehicle according to claim 1, wherein
said battery case includes a battery cover and a battery tray, and
said framework member is embedded in the battery tray.

10. The structure for mounting the battery to the electric vehicle according to claim 8, wherein
said battery tray includes a partition that divides the compartment into small blocks in which the battery is disposed.

11. The structure for mounting the battery to the electric vehicle according to claim 10, wherein
one end of said battery holder is fixed to the partition.

12. The structure for mounting the battery to the electric vehicle according to claim 1, wherein
said body member includes a pair of first body members extending in a longitudinal direction of the electric vehicle
said framework member includes
a front framework, and
a rear framework, which is independent from said front framework, being disposed rearward of said front framework,
said front framework includes,
a first front frame being fixed to one of the first body members,
a second front frame being fixed to another of the first body members, and
a third front frame being disposed between said first front frames and said second front frames,
one of said first front frame and said second front frame is an L-shaped member.

13. The structure for mounting the battery to the electric vehicle according to claim 11, further comprising:
a first supporting member, which is a metal member fixed to a bottom of said battery case and which is extended in a width direction of the electric vehicle, and
a built-in nut fixed on said first supporting member, extending in the vertical direction so as to be embedded in the partition, and connecting the one end of said battery holder to said first supporting member.

* * * * *